US011126972B2

(12) United States Patent
Shaya et al.

(10) Patent No.: US 11,126,972 B2
(45) Date of Patent: Sep. 21, 2021

(54) ENHANCED TASK MANAGEMENT FEATURE FOR ELECTRONIC APPLICATIONS

(71) Applicant: Microsoft Technology Licensing, LLC, Redmond, WA (US)

(72) Inventors: Omar Shaya, Berlin (DE); Bernd Ingo Plontsch, Berlin (DE); Shahar Prish, Even Yehuda (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 16/359,204

(22) Filed: Mar. 20, 2019

(65) Prior Publication Data

US 2020/0302404 A1 Sep. 24, 2020

(51) Int. Cl.
  *G06F 40/20* (2020.01)
  *G06F 3/0482* (2013.01)
  *G06Q 10/10* (2012.01)

(52) U.S. Cl.
  CPC ....... *G06Q 10/1097* (2013.01); *G06F 3/0482* (2013.01); *G06F 40/20* (2020.01)

(58) Field of Classification Search
  CPC ...... G06Q 10/00; G06Q 40/00; G06Q 10/097; G06F 40/20; G06F 3/0482
  USPC ...................................................... 705/7.21
  See application file for complete search history.

(56) References Cited

U.S. PATENT DOCUMENTS

| 6,938,048 B1* | 8/2005 | Jilk | G06Q 10/06 |
| | | | 707/999.003 |
| 2003/0204367 A1 | 10/2003 | Hartigan et al. | |
| 2008/0114809 A1* | 5/2008 | MacBeth | G06F 16/248 |
| 2010/0046029 A1* | 2/2010 | Suzuki | G06F 16/93 |
| | | | 358/1.15 |
| 2011/0145823 A1* | 6/2011 | Rowe | G06Q 10/109 |
| | | | 718/100 |
| 2014/0033216 A1* | 1/2014 | Wang | G06F 9/48 |
| | | | 718/102 |
| 2020/0007322 A1* | 1/2020 | Weldemariam | G06F 16/27 |
| 2020/0104777 A1* | 4/2020 | Bouhini | G06N 20/00 |

OTHER PUBLICATIONS (Imixs Open Source Workflow—The Workflow Task Properties), 2018, pp. 1-5. (Year: 2018).*

(Continued)

*Primary Examiner* — Romain Jeanty
(74) *Attorney, Agent, or Firm* — Talem IP Law, LLP

(57) ABSTRACT

An enhanced task management feature can provide enhanced task management capabilities including making the entering of new tasks in an electronic application easier for the user, such as having the user see suggestions of where to put the new task and, in some cases, providing suggestions for details associated with the task. The enhanced task management feature can receive task input associated with a task item from an application; use the task input and at least a user-specific model to identify at least one likely task list name for the task item; and provide a suggested task list name from the at least one likely task list name to the application for display. The enhanced task management feature can receive from user input a task list name and the task item and the task item can then be assigned to a task list associated with the task list name.

20 Claims, 14 Drawing Sheets

(56) References Cited

OTHER PUBLICATIONS

Simone et al (Improving Intelligent Assistants for Desktop Activities), Dec. 2006, American Association for Artificial Intelligence, pp. 1-3 (Year: 2006).*

"International Search Report and Written Opinion Issued in PCT Application No. PCT/US2020/021936", dated Jun. 25, 2020, 12 Pages.

* cited by examiner

ENHANCED TASK MANAGEMENT FEATURE FOR ELECTRONIC APPLICATIONS

BACKGROUND

A task, or a to-do, refers to a piece of work to be done or undertaken. Task management applications provide a way to organize tasks in lists and allow users to manage their tasks from various devices, such as a smart phone, a tablet, a computer, or a smart watch.

Users want to create new tasks and to-dos quickly, but many times find it hard to organize the tasks in lists or simply forget to add the tasks to a specific list. In many cases, users capture multiple tasks in a general to-do list and end up with a long list of unorganized tasks. When this occurs, multiple tasks from multiple categories are found in one place. Then, when the user comes back to the long list of unorganized tasks, the user may not remember why each task was added or where each task belongs.

BRIEF SUMMARY

An enhanced task management feature for electronic applications is provided. The described enhanced task management feature can provide enhanced task management capabilities including making the entering of new tasks in an electronic application easier for the user, such as having the user see suggestions of where to put the new task and, in some cases, providing suggestions for details associated with the task.

The enhanced task management feature can receive task input associated with a task item from an application. The enhanced task management feature can use the task input and at least a user-specific model to identify at least one likely task list name for the task item and provide a suggested task list name from the at least one likely task list name to the application for display. The user-specific model comprises user-specific data; and the user-specific data comprises existing user-specific task lists and associated task items. The enhanced task management feature can receive from user input a task list name and the task item (which may be from the task input). The task list name can be a selection of one of the suggested task list name, a new task list name, or a different task list name. The task item can then be assigned to a task list associated with the task list name. The user-specific model can be updated with the task item and the task list name.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
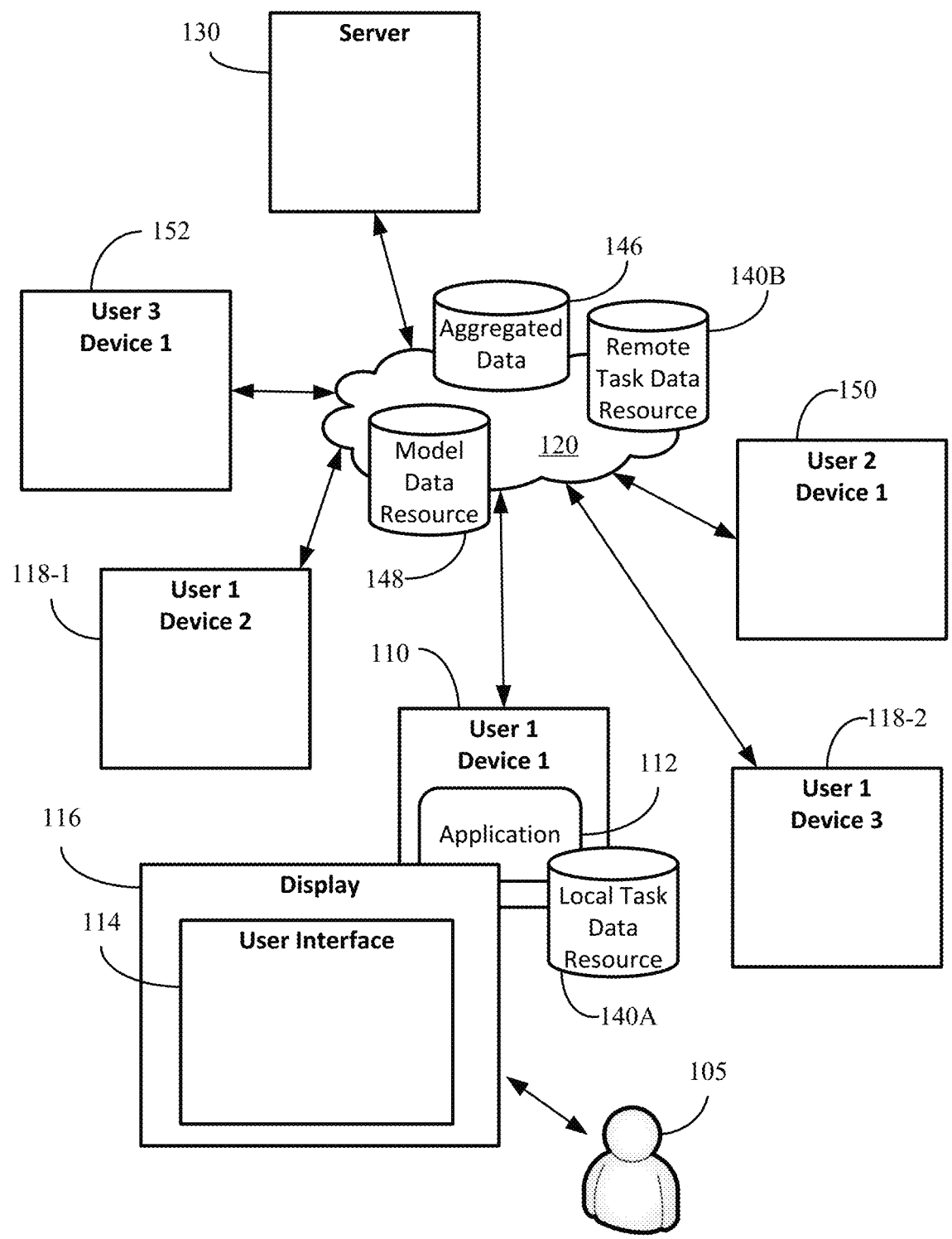
FIG. 1 illustrates an example operating environment in which various embodiments of the invention may be practiced.

An enhanced task management feature for electronic applications is provided. The described enhanced task management feature can provide enhanced task management capabilities including making the entering of new tasks in an electronic application easier for the user, such as having the user see suggestions of where to put the new task and, in some cases, providing suggestions for details associated with the task.

Task management applications provide a way to add and organize task items in lists and allow users to manage their tasks from various devices, such as a smart phone, a tablet, a computer, or a smart watch. Task lists can be created to categorize task items and these task lists can be placed in task folders to organize their structure. Multiple task items can be created in each task list. In some cases, the task lists and associated task items can be stored in a task management service.

In some cases, for each user, a task management application can include multiple default task lists as well as user created task lists. As an example of a default task list, the task management application can include a daily task list. The task management application can suggest task items to add to the daily task list and/or users can add existing task items to the daily task list. In some cases, if a task item on the daily task list is not completed, the task item may be suggested the following day.

A task item refers to a piece of work to be done or undertaken. A task management application uses task items as the basic entity and provides a digital representation of those task items. The digital representation includes attributes (e.g., properties) that indicate additional information about the task item. The attributes can indicate, for example, what the task item is (typically in natural language description), if the task item has been completed or not, if the task item includes sub task items, if the task item has a due date or a reminder, and if the task has attached files.

A task item can be created, for example, by entering task input, such as the task item's name, into a task input field. In some cases, the task item will be added to the bottom of a task list. Each task item can be assigned a variety of task properties. Task properties can be added to a task item through, for example, a detail view of the task item. The detail view can display any information associated with the task item, such as the assigned task properties. Task properties can include, but are not limited to, due dates (including repeating due dates), reminders, importance, status, assignees, subtasks, comments, files, and notes.

The due date task property can allow a due date to be added for the task item. The due date can be, for example, today, tomorrow, next week, or a custom date. The due date task property can also be a repeating due date task property. The repeating due date task property can allow a due date to be set to repeat, for example, daily, on weekdays, weekly, monthly, yearly, or a custom repeat. The reminder task property can allow a reminder to be added for the task item. The reminder can be, for example, for later today, tomorrow, next week, or for a custom date. In some cases, a location reminder may be added for a task item. In this case, the reminder may be displayed at a certain location.

The subtask property can allow larger task items to be broken down into smaller, more actionable pieces. Multiple subtasks can be added for each task item. The notes task property can allow extra information to be added to the task item. The files task property can allow more context to be added by uploading an image, document, or other file to a task item.

The importance property can add priority to a task item. To assign the importance property to a task item, a star symbol may be selected for each important task item in each task list. In some cases, once starred, all prioritized task items can be viewed in an "Important" list. In some cases, each task list can be sorted by Importance to allow starred task items to automatically move to the top of the task list.

The status task property can indicate if the task item has been marked as completed. In some cases, task items with a status task property of completed will be hidden from a list view of the task items. In some cases, task items with a status task property of completed can be visually distinguished from task items with a status task property of not completed.

Task management applications can be integrated with various other applications, such as other productivity applications. Productivity applications are software applications in which users can contribute information to generate and curate content. The productivity applications that can incorporate the described features and services are directed to visual content where users can create text and/or image-based content in digital form. Example productivity applications include, but are not limited to, whiteboard applications, presentation applications, word processing applications, spreadsheet applications, email applications, personal information managers, calendar applications, communication applications, messaging applications, notebook applications, and web applications.

According to certain examples, the described enhanced task management feature can automatically predict a task list for new task items and to-dos, automatically predict additional task properties, and surface reminders. Through the additional functionality, the described enhanced task management feature can help users be more organized and improve the user experience by minimizing the user input requirements.

Through the integration of the described feature with various applications, users can capture and manage task items within a variety of applications. For example, task items created in a calendar application can be stored in the task management service and can be accessed in another application, such as the task management application or an email application. In some cases, a user can create or modify a task item in other applications and get alerts for those task items when they're in those applications.

The enhanced task management feature can be implemented by a task management service and a prediction engine. The described enhanced task management feature is suitable for any application that includes a task input field connected to a task management application back end (e.g., task management server).

In some examples, machine learning is used to predict the appropriate existing task list for a new task item or to suggest a new list name that best matches the new task item. List predictions can happen in real time or near real time while the user is entering task input associated with a task item.

The user may be shown an ordered list of suggested task lists that best match the new task item. In some cases, the suggested task lists are from the user's own created task lists. Suggestions of names for new lists that the user has not used yet but were found to best match the user's task item based on other task lists may also be provided.

In some cases, the task list prediction can be performed by analyzing the characters corresponding to the entered task input. Similarly, task list predictions can be made from other characteristics of the entered task input, such as what time and day the system indicates when the task input is received or where the system indicates it is located geographically when the input is received. In addition to predicting the task list of the task item, additional task properties may also be predicted, such as, but not limited to, whether the task item is important, what a good due date would be, or potentially any other property of the new task item.

In some cases, the enhanced task management feature can automatically generate and surface reminders in an appropriate way based on assigned task properties. The enhanced task management feature can receive a trigger for a task property assigned to at least one task item. The at least one task item can be a task item from an existing user-specific task list in the user-specific data.

In some cases, the enhanced task management feature can obtain context information and can determine at least one reminder by analyzing the trigger, the task items from the user-specific data, and the context information. The enhanced task management feature can provide the at least one reminder for display. The enhanced task management feature can analyze previously created user-specific data and can predict one or more reminders for each day. In some cases, the enhanced task management feature can determine the task items that are the most likely candidates that belong on a daily task list.

The terms "to-do", "task", "to-do item", and "task item" may be used interchangeably herein. The terms "to-do list" and "task list" may be used interchangeably herein. The terms "task management application" and "list management application" may be used interchangeably herein.

FIG. 1 illustrates an example operating environment in which various embodiments of the invention may be practiced. Referring to FIG. 1, a user 105 may interact with a user computing device 110 running an application 112, such as a task management application or a productivity application, and view a UI 114 of the application 112 displayed on a display 116 associated with the computing device 110.

User computing device 110 may be embodied such as described with respect to system 1300 of FIG. 13 and configured to receive input from a user (e.g., user 105) through, for example, a keyboard, mouse, trackpad, touch pad, touch screen, microphone, or other input device. The display 116 of the user computing device 110 is configured to display one or more user interfaces (including UI 114) to the user 105. In some embodiments, the display 116 can include a touchscreen such that the user computing device 110 may receive user input through the display.

The UI 114 enables a user to interact with various applications, such as a task management application, running on or displayed through the user computing device 110. For example, UI 114 may include a task input field for natural language input through which task input associated with a task item can be entered. The UI 114 may also include the use of a context menu, a menu within a menu bar, a menu item selected from a ribbon user interface, a graphical menu, and the like. Generally, UI 114 is configured such that a user may easily interact with functionality of an application. For example, a user may simply select (via, for example, touch, clicking, gesture or voice) an option within UI 114 to perform an operation such as creating a new task item or task list or modifying an existing task item or task list in application 112.

In some cases, the user 105 may have multiple devices running a similar program and the user 105 can view and edit a same or different task item or task list (or other content) across multiple user computing devices (such as second device 118-1 and/or third device 118-2).

The user computing device 110 (as well as the second device 118-1 and the third device 118-2) may operate on or in communication with a network 120, and may communicate with one or more servers 130 supporting task management services over the network 120.

According to certain embodiments of the invention, while a user is creating a new task item or task list or otherwise interacting with a task item or task list in the UI 114 (and with the user's express permission), user-specific data can be collected and stored for each interaction and/or each task item in a task data resource 140 (e.g., local data resource 140A or remote task data resource 140B). For example, when a user enters task input in a task input field of an application, the user-specific data can be stored.

The user-specific data can include data about a user's existing (e.g., current) task lists (e.g., existing user-specific task lists). The user-specific data about the existing user-specific task lists can include, for example, task list names and associated task items. The user-specific data can also include additional task properties assigned to the task items. Examples of additional task properties may include reminder information (e.g., a reminder time or a reminder location), a due date, a note (e.g., text of the note attached to the task item), repeat information.

In some cases, the user-specific data can include a task interaction history for each task item. For example, the user-specific data can include, for each task interaction, an interaction type and data associated with that interaction, such as an interaction ID, a task item ID, the task item, and the task list name. The interaction type may include, but is not limited to, tapping on a task item (e.g., selecting or tapping on the task item to open a detail view), updating a task item, moving a task item, completing a task item, viewing a task item (e.g., task items visible on a screen, such as task items the user can see when switching to a list view), creating a task item, and deleting a task item.

In some cases, when permitted by a user, the user-specific data may also include the location where the interaction took place. The location may be in the form of geo-coordinates (e.g., a longitude and a latitude), Cell ID, address, computer name, or the like.

In some cases, the user-specific data may also include a timestamp indicative of when the interaction took place. The timestamp may include the day of the week, the day of the month, and the time of day the interaction took place. It should be understood that other data may also be stored.

With the user's permission, the user-specific data may be anonymized and stored in an aggregated data resource 146. The aggregated data resource 146 can contain an aggregate of anonymized user-specific data for a plurality of users ("aggregated data"). For example, user-specific data from other users of the same or other computing devices, such as second user computing device 150 and third user computing device 152, can be communicated over the network 120 and stored in the aggregated data resource 146. The aggregated data may be managed by a server (e.g., server 130) or service associated with the task management application.

The user-specific data for the task data resource 140 can be used to generate various user-specific models based on the user's current task lists and task interaction history of the user as well as changes over time. The aggregated data can be used to create various aggregated models based on the existing aggregated task lists (and corresponding interaction history) of the task management application over time. The models can be stored in a model resource 148.

Each of the various models can be any suitable machine learning or neural network model and can employ user-specific data and/or aggregated data. The model(s) can be used to identify (e.g., predict) the most likely task lists and/or task properties based on a user's task input (and optionally context information).

FIGS. 2A, 2B, 3, and 4 illustrate example process flow diagrams for providing enhanced task management capabilities according to certain embodiments of the invention. An enhanced task management feature performing process 200 described with respect to FIG. 2A, process 250 described with respect to FIG. 2B, process 300 described with respect to FIG. 3, and process 400 described with respect to FIG. 4, can be implemented by server 130 such as shown in FIG. 1, which can be embodied as described with respect to computing system 1400 shown in FIG. 14 and even, in whole or in part, by user computing device 110, which can be embodied as described with respect to computing system 1300 as shown in FIG. 13.

Process 200 may be performed entirely on a user's computing device and even offline in some cases. Referring to process 200 of FIG. 2A, the enhanced task management feature can receive (205) task input associated with a task item from an application. The task input can be the title or name of the task item. In some cases, the task input may be a natural language statement, sentence, or phrase. In some cases, the task input may be one or more words.

The task input can be received through a task input field (text or audio) provided by any suitable application, such as a task management application or a productivity application that can communicate with the task management service. For example, the productivity application may be a calendar application that includes one or more task input fields for task items.

The enhanced task management feature can identify (210) at least one likely task list name for the task item using the task input and at least a user-specific model. The user-specific data can comprise existing user-specific task lists and associated task items. The user-specific data can also include task interaction history of the user as well as other task properties. The user-specific model can employ the user-specific data and be used to identify (e.g., predict) the most likely task lists to which the task item belongs based on the user's existing task lists.

The user-specific model can be a generated using user-specific data stored in a task data resource, such as task data resource 140A or task data resource 140B as described with respect to FIG. 1. One or more user-specific models may be generated using any suitable machine learning or other artificial intelligence process. For example, a user-specific model may be generated by tokenizing the user-specific data and assigning each token a certain weight.

For example, the frequent tokens can be assigned a low weight, while the less frequent tokens can be assigned a higher weight. As an illustration, words such as "plan" "trip" "hotel" and "milk" may be assigned a high weight, while words such as "and" "a" and "the" may be assigned a low weight. The higher weighted tokens can be used to generate a user-specific model indicating terms in a particular list.

The identifying of the at least one likely task list name can include analyzing the task input and the user-specific data using the user-specific model to determine the at least one likely task list name for the task item. For example, using the k-nearest neighbors, the task input can be compared to the content of the user's existing task lists (e.g., in the form of the user-specific model) to determine the most appropriate task list for the task item.

In an example of a "travel" task list, the terms "plan" and "city guide" and "booking" and "hotel" and "trip" may appear frequently. These terms or keywords can then be considered strong signals for a "travel" task list when analyzing the task input.

In an example of a "work" task list, the terms "plan" and "meeting" and "email" and "review" and "schedule" and "call" may appear frequently. These terms or keywords can then be considered strong signals for a "work" task list when analyzing the task input.

In some cases, the analysis of the task input and the user-specific data can produce a confidence value, such as a number between 0 and 1, which can indicate how likely it is that the task item belongs to a certain existing user-specific task list. In an example where the task input is "plan the trip" the analysis of the task input and the user-specific model can determine that the task has an 80 percent chance of being in the "travel" task list and a 20 percent chance of being in the "work" task list.

In some cases, identifying the at least one likely task list name for the task item can be performed in real-time or near real time. For example, if a user enters the term "plan" into the task input field as a task item, the analysis can determine that the task item has a 40 percent chance to be part of a "work" task list and has a 10 percent chance of being part of a "travel" task list. Then, when the user finishes entering the full task as "plan the trip," then the prediction calculation can determine that the task has an 80 percent chance of being in the "travel" task list and a 20 percent chance of being in the "work" task list. Of course, attempt of predicting a task list may occur character by character.

In some cases, the enhanced task management feature can obtain context information. The context information can be used while performing the identification of the at least one likely task list name for the task item.

Context information includes, but is not limited to, a current date/time, certain actions or inactions by a user, location (geo-location, home, office, mobile), content, client type, application permissions (reader mode, full editing mode), application type, application state, file, and the like. Context information can also include immediately preceding interactions of the user.

In some cases, by knowing the context information of client location, predictive information directed to task items generally interacted with at that location may be provided. For example, when a signal indicates that a user is working from their office, certain task lists may be more likely to be used as opposed to when a user is working from home. In another example, when a user's location indicates they are at a grocery store, a "grocery" task list may be the most appropriate task list.

In some cases, by knowing the context information of when (date/time) certain task items are interacted with, the at least one likely task list name for the task item may be based on time-related preferences. For example, task items entered during the day from Monday to Friday may relate to work. Thus, the most likely task list may return a "work" task list.

The user-specific models may include such models generated using any suitable machine learning or neural network or other artificial intelligence process. It should be understood that the methods of performing the identification of the at least one likely task list name for the task item include, but are not limited to, hierarchical and non-hierarchical Bayesian methods; supervised learning methods such as Support vector Machines, neural nets, bagged/boosted or randomized decision trees, and k-nearest neighbor; and unsupervised methods such as k-means clustering and agglomerative clustering. In some cases, other methods for clustering data in combination with computed auxiliary features may be used by the enhanced task management feature as appropriate.

Once the at least one likely task list name for the task item is identified (210), the enhanced task management feature can provide (215) a suggested task list name from the at least one likely task list name for display. The suggested task list name can include a task list name from the existing user-specific task lists. For example, the suggested task list name may be a name of one of the user's current task lists. In some cases, the suggested task list name is a name of one of the user's previously used, but currently not used task list. The enhanced task management feature can provide the suggested task list name in real-time or near real-time.

The enhanced task management feature can receive (220) a task list name and the task item from user input. Once the task list name and the task item are received (220), the enhanced task management feature can assign (225) the task item to a task list associated with the task list name. The task item and task list can be stored in the task data resource.

The task list name received in 220 can be a selection of the suggested task list name, a new task list name, or a different task list name. The different task list name is a task list name of an existing user-specific task list that is not the suggested task list name. In an example, instead of the suggested task list, the user may prefer to select a different task list from the user's existing task lists in which to include the task item.

The new task list name can be input of a task list name for a task list not included in the existing user-specific task lists. For example, the user may decide to create a new task list for the task item instead of selecting the suggested task list name or a name of an already existing different task list (i.e., the different task list name). In this case, the user can enter a task list name for the new task list.

In an example, a user may have three existing task lists, including a "grocery" task list, a "work" task list, and a "travel" task list. If the user inputs "water" as the task input associated with the task item, the suggested task list name provided for display to the user may be one of the user's three existing task lists, such as "grocery".

Continuing with the example, if the user agrees with the displayed suggested task list name, the user may add the task item to the "grocery" task list by selecting the "grocery" task list name. In this case, the task list name received by the enhanced task management feature is a selection of the suggested task list name.

Continuing with the example, if the user does not want to add the task item to the "grocery" task list but would like to add the task item to a different one of the user's three existing task lists, the user can select either the "work" task list or the "travel" task list. In this case, the task list name received by the enhanced task management feature is a selection of the different task list name.

Continuing with the example, if the user does not want to add the task item any of the user's three existing task lists but would like to create a new "health" task list to add the task item to, the user can enter a name (e.g., "health") of the new task list. In this case, the task list name received by the enhanced task management feature is a selection of the new task list name.

In cases where the task list name is a new task list name, the enhanced task feature can create a new task list for the new task list name before assigning the task item to the task list. Once the task list has been created, the task item can be assigned to the newly created task list.

The enhanced task management feature can update (230) the user-specific model with the task item and the task list name.

Figure 2A:
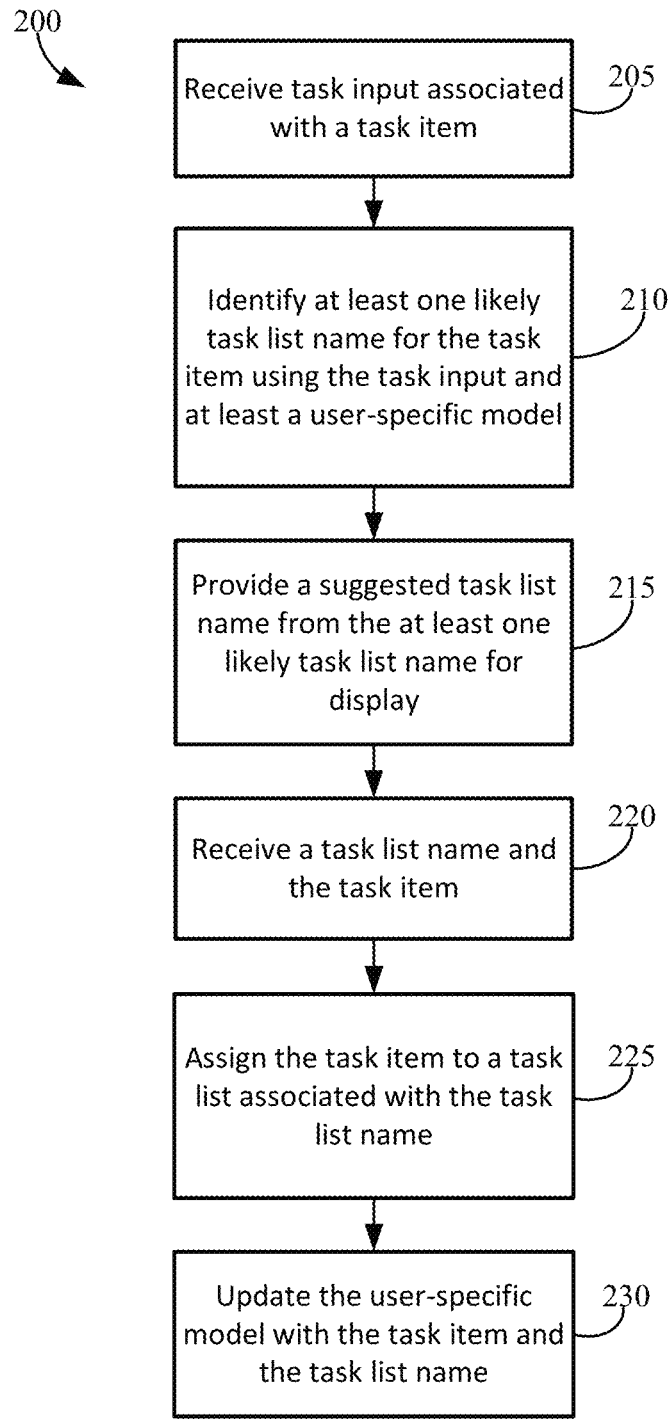
FIGS. 2A and 2B illustrate example process flow diagrams for providing enhanced task management capabilities according to certain embodiments of the invention.
Figure 2B:
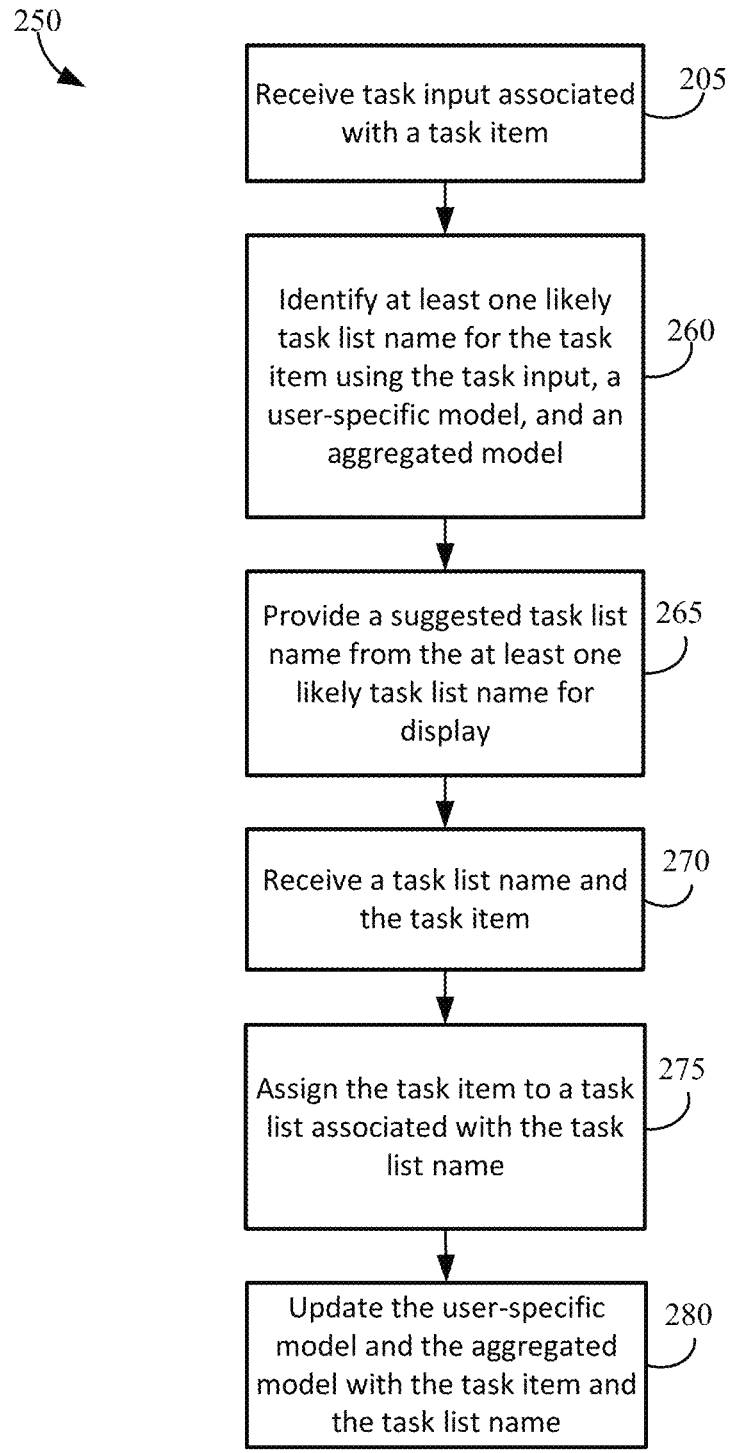

FIG. 2B illustrates a method incorporating aggregated data. Referring to FIG. 2B, similar to process 200, process 250 begins with receiving (205) task input associated with a task item from an application.

In process 250, the enhanced task management feature can identify (260) at least one likely task list name for the task item using the task input, a user-specific model, and an aggregated model. The user-specific model may be generated as described with respect to FIG. 2A.

The aggregated model can be generated in a similar manner as the user-specific model (as described with respect to FIG. 2A) but using aggregated data stored in an aggregated data resource, such as aggregated data resource 146 as described with respect to FIG. 1.

The aggregated data can be an aggregate of user-specific data for a plurality of users. The aggregated data can include existing aggregated task lists and associated task items (and may also, where permitted, include context information). The aggregated model can employ the aggregated data and be used to identify (e.g., predict) the most likely task lists to which the task item belongs based on an aggregated set of existing task lists collected from a plurality of users over time.

The enhanced task management feature may use a combination of user-specific models and/or aggregated models to identify the at least one likely task list name for the task item. In some cases, the at least one likely task list name for the task item can include not only one or more of the existing user-specific task lists, but also a task list from the existing aggregated task lists. In some cases, the task list from the existing aggregated task list may not be a task list included in the existing user-specific task lists.

In an example, a user may have three existing task lists, including a "grocery" task list, a "work" task list, and a "travel" task list. If the user inputs "water" as the task input associated with the task item, the enhanced task management feature can identify the at least one likely task list name for the task item using the task input, the user-specific data, and the aggregated data.

The enhanced task management feature may use the user-specific model to identify a name of an existing user-specific task list (e.g., the most likely task list from the user's three existing task lists). For example, the enhanced task management feature can determine that the "grocery" task list name is one of the at least one likely task list name.

The enhanced task management feature may use the aggregated model to identify a name of an existing aggregated task list as one of the at least one likely task list name for the task item. For example, the enhanced task management feature may determine, based on the aggregated model, the term "water" is most likely to belong to a "daily habit" task list. In this case, the name of the existing aggregated task list is a task list not previously created by the user, but is suggested to the user.

In another example, the user may be a new user and may not have created any task lists, such as a "grocery" task list. If the user enters "milk" as the task input, the enhanced task management feature can analyze the task input, user-specific model, and the aggregated model, to determine that the most likely task list is a "grocery" task list even though the user does not have an existing "grocery" task list. The enhanced task management application may suggest a new "grocery" list name for the user to add the milk task item to.

In some cases, the enhanced task management feature can obtain context information. The context information can be used while performing the identification of the at least one likely task list name for the task item. Some context information may be obtained from the user-specific data. In other cases, the context information is obtained from other memory locations storing information related to a current electronic application session of a user.

Once the at least one likely task list name for the task item is identified (260), the enhanced task management feature can provide (265) a suggested task list name from the at least one likely task list name for display. The suggested task list name can be a task list name from the existing user-specific task lists or a task list name from the existing aggregated task lists. The order or decision of what task list names are provided to the user can be cased on any suitable approach, including, but not limited to, grouping user-specific names first.

Continuing with the example where the user has three existing task lists, including a "grocery" task list, a "work" task list, and a "travel" task list, and the user inputs "water" as the task input associated with the task item, the enhanced task management feature can provide, as the suggested task list name, either the "grocery" task list name (from the existing user-specific task lists) or the "daily habit" task list name (from the existing aggregated task lists).

In some cases, more than one suggested task list names from the at least one likely task list name may be provided for display. For example, the enhanced task management feature can provide both the "grocery" task list name (from the existing user-specific task lists) and the "daily habit" task list name (from the existing aggregated task lists). It should be understood that any number of suggested list names may be provided for display.

In some cases, the enhanced task management feature can provide the suggested task list name in real-time or near real-time. That is, as the user enters task input, the suggested task name displayed may be updated.

The enhanced task management feature can receive (270) a task list name and the task item as user input. Once the task list name and the task item are received (270), the enhanced task management feature can assign (275) the task item to a task list associated with the task list name.

The task list name can be a selection of the suggested task list name, a new task list name, or a different task list name. The different task list name is a task list name of an existing user-specific task list that is not the suggested task list name. In an example, instead of the suggested task list, the user may prefer to select a different task list from the user's existing task lists in which to include the task item.

The new task list name can be input of a task list name for a task list not included in the existing user-specific task lists or in the existing aggregated task lists. For example, the user may decide to create a new task list for the task item instead of selecting the suggested task list name or a name of an already existing different task list (i.e., the different task list name). In this case, the user can enter a task list name for the new task list.

Continuing with the example where the user has three existing task lists, including a "grocery" task list, a "work" task list, and a "travel" task list, and receives a suggested task list name for the task input "water," the enhanced task management feature can receive a task list name and the task item (e.g., "water").

In some cases, the task list name received by the enhanced task management feature is a selection of the suggested task list name (e.g., the user selects the displayed suggested task list name).

In the case where the suggested task list name is the "grocery" task list name (from the existing user-specific task lists), the enhanced task management feature can receive the "grocery" task list name and the task item. Since the task list associated with the task list name (e.g., "grocery" task list name) is an existing user-specific task list, the enhanced task management feature can assign "water" to the "grocery" task list.

In the case where the suggested task list name is the "daily habit" task list name (from the existing aggregated task lists), the enhanced task management feature can receive the "daily habit" task list name and the task item. In some cases, the task list associated with the task list name (e.g., "daily habit" task list name) is not an existing user-specific task list. In this case, the enhanced task management feature can create the "daily habit" task list and assign "water" to the created task list.

In some cases, the task list name received by the enhanced task management feature is a selection of the different task list name. For example, the user may not agree with the suggested task list name and prefer to add the task item to a different task list from the existing user-specific task list, such as the "travel" task list. When the user selects the "travel" task list, the enhanced task management feature can receive the "travel" task list name and the task item. Since the task list associated with the task list name (e.g., "travel" task list name) is an existing user-specific task list, the enhanced task management feature can assign "water" to the "travel" task list.

In some cases, the task list name received by the enhanced task management feature is a selection a new task list name. For example, the user may not want to add the task item any of the user's three existing task lists or the suggested task list name, but would like to create a new "health" task list to add the task item to. When the user enters a name (e.g., "health") of the desired new task list, the enhanced task management feature can receive the "health" task list name and the task item. Since the task list associated with the task list name (e.g., "travel" task list name) is an existing user-specific task list, the enhanced task management feature can assign "water" to the "travel" task list. Since the task list associated with the task list name (e.g., "health" task list name) is not an existing user-specific task list, the enhanced task management feature can create the "health" task list and assign "water" to the created task list.

The enhanced task management feature can update (280) the user-specific model and the aggregated model with the task item and the task list name.

Figure 3:
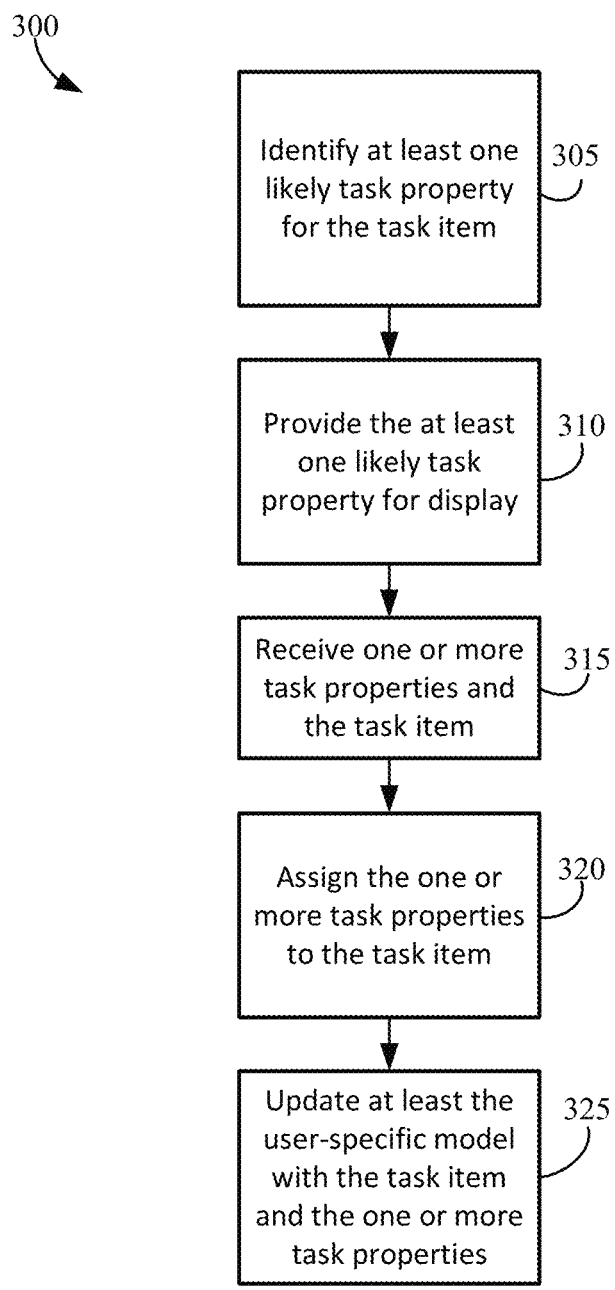
FIG. 3 illustrates an example process flow diagram for providing enhanced task management capabilities according to an embodiment of the invention.

Referring to FIG. 3, in addition to identifying likely task lists for a task item, the enhanced task management feature can identify likely task properties of the task item. As previously described, task properties can include, but are not limited to importance, status, due dates (including repeating due dates), reminders, assignees, subtasks, comments, files, and notes.

In some cases, process 300 can begin automatically in response to a user entering task input associated with a task item, as described in step 205 of FIG. 2A or FIG. 2B. The task input can be the title or name of the task item. In some cases, the task input may be full sentences. In some cases, the task input may be one or more words. In this case, the enhanced task management feature for predicting task properties can initiate upon receiving the task input associated with the task item.

In some cases, process 300 can begin in response to a user requesting task properties for a task item. In this case, the enhanced task management feature for predicting task properties can initiate upon receiving the request for task properties, which can include the task item.

The enhanced task management feature can identify (305) at least one likely task property for the task item. The enhanced task management feature can analyze the task item, the context information, and one or more of user-specific models (and optionally aggregated models) to determine the at least one likely task property for the task item. For example, the task input can be compared to the content of a user's existing task lists and optionally content of an aggregated set of existing task lists collected from a plurality of users over time to determine the most appropriate task properties for the task item.

The enhanced task management feature can obtain context information from a variety of sources. For example, the context information may have been communicated with the request for task properties. In another example, the enhanced task management feature may communicate with a device operating system and GPS to receive the context information.

Context information includes, but is not limited to, a current date/time, certain actions or inactions by a user, location (geo-location, home, office, mobile), content, client type, application permissions (reader mode, full editing mode), application type, application state, file, and the like. Context information can also include immediately preceding interactions of the user.

The enhanced task management feature can provide (310) the at least one likely task property for display. The at least one likely task property may be displayed in any suitable manner.

In an illustrative scenario, a user may enter task input of "prep for presentation" in the task input field. The enhanced task management feature can compare the task input with the user-specific model to determine at least one likely task property for the task item. For example, the enhanced task management feature may determine the task item is important because the task input is similar to task items previously designated as important by the user, such as "presentation day" and "submit slides for presentation". In another example, the enhanced task management feature may determine that a likely due date for the task item is tomorrow because the task input is similar to existing task items with a due date of tomorrow.

In another scenario, a user may enter task input of "buy birthday present for mom" in the task input field at 9:00 AM on a Saturday. In this case, the task input is "buy birthday present for mom" and context information is 9:00 AM on a Saturday. The enhanced task management feature can compare the task input and context information with the user-specific model to determine at least one likely task property for the task item. For example, the enhanced task management feature may determine a likely reminder day for the task item is "later today" because the task input is similar to task items previously marked complete at 4:00 PM on a Saturday, such as "buy get well card for Bill" and "pick up Jane's present". In another example, the enhanced task management feature may determine that a likely due date for the task item is tomorrow because the task input is similar to existing task items with a due date of tomorrow, for example "decorate for mom's birthday party".

The user can select one or more of the displayed at least one likely task property to assign to the task item. The enhanced task management feature can receive (315) one or more task properties and the task item. Once the one or more task properties and the task item are received (315), the enhanced task management feature can assign (320) the one or more task properties to the task item.

The task item with the assigned one or more task properties can be provided for display. In some cases, a display of the task item can be updated to show the task property assigned to the task item.

The enhanced task management feature can update (325) at least the user-specific model with the task item and the one or more task properties. In some cases, the aggregated model can be updated with the task item and the one or more task properties. In some cases, the context information is also used to update the user-specific model and/or the aggregated model.

The enhanced task management feature can update task properties for all active task items. Active task items refer to task items that have not been marked complete. The active task items can have a status task property of not complete. In some cases, the user may be notified of any updated task properties and select which task properties, if any, to update.

In some cases, the enhanced task management feature may receive a request to update the task properties for all active task items one or more existing user-specific task lists. In this case, the enhanced task management feature can analyze the one or more existing user-specific task lists to determine each active item.

In some cases, the enhanced task management feature may periodically or at predetermined times analyze one or more existing user-specific task lists to determine each active item.

The enhanced task management feature can obtain context information and then identify likely task properties for each active task item by analyzing the active task items, the context information, and one or more of the user-specific data of the user-specific model and aggregated data from the aggregated model. Then, for any changes found, the enhanced task feature can update the task properties.

The enhanced task management feature can update the task properties for each active task item. In some cases, the enhanced task management feature can compare, for each active task item, the one or more likely task properties identified to any currently assigned task properties of the active task item. When a change is found, the enhanced task management feature can then update a currently assigned task property with the likely task property identified.

Figure 4:
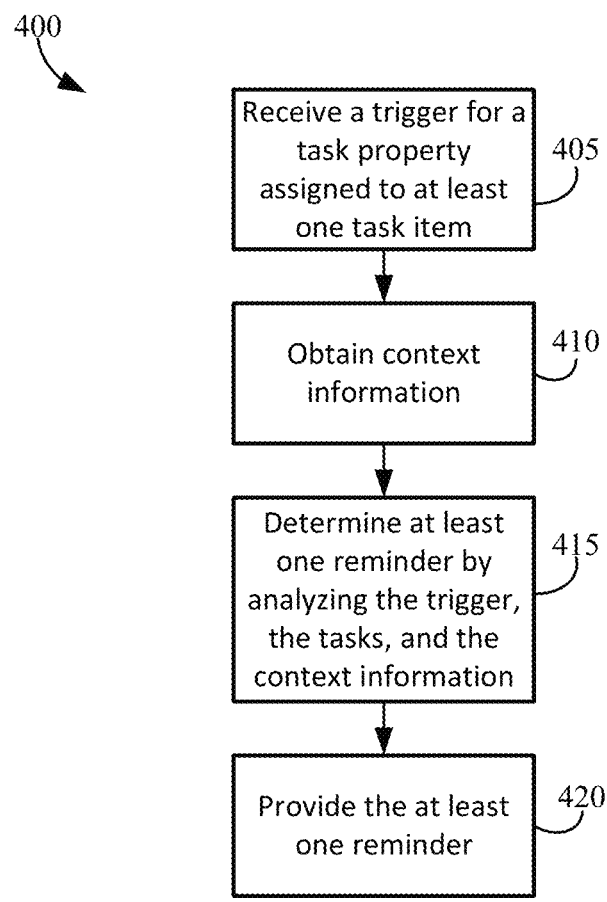
FIG. 4 illustrates an example process flow diagram for providing enhanced task management capabilities according to an embodiment of the invention.

Referring to FIG. 4, a process is shown for generating reminders/notifications. For example, the enhanced task management feature can automatically generate and surface reminders in an appropriate way based on assigned task properties. The enhanced task management feature can receive (405) a trigger for a task property assigned to at least one task item. The at least one task item can be a task item from an existing user-specific task list in existing user-specific data.

One example of the trigger may include a location. For example, the enhanced task management feature can receive a trigger for a location when a user is at a grocery store or a mall. In some cases, the trigger may be recognized using existing tagged maps. Another example of the trigger may include a time of day. For example, the enhanced task management feature can receive a trigger every 15 minutes or every hour.

The enhanced task management feature can obtain (410) context information. For example, the enhanced task management feature may communicate with a device operating system to receive the context information. Context information includes, but is not limited to, a current date/time, certain actions or inactions by a user, location (geo-location, home, office, mobile), content, client type, application permissions (reader mode, full editing mode), application type, application state, file, and the like. Context information can also include immediately preceding interactions of the user.

The enhanced task management feature can determine (415) at least one reminder by analyzing the trigger, the task items from the user-specific data, and the context information. The enhanced task management feature can provide (405) the at least one reminder for display. The enhanced task management feature can analyze previously created user-specific data and can predict one or more reminders for each day. Indeed, the enhanced task management feature can determine the task items that are the most likely candidates that belong on a daily task list.

The enhanced task management feature can analyze the user-specific data to determine one or more reminders. For example, the enhanced task management feature can analyze historical behavior, such as what task items were added on each day. The enhanced task management feature may also determine the one or more reminders by analyzing the current time of day and also the task items and associated properties, such as the title or name of the task item, the task list was the task item assigned, reminders or due dates of the task item, and any notes. The enhanced task management feature can also analyze the recent interactions with the task items.

In the example where the location trigger is a grocery store, the enhanced task management feature can analyze the user-specific data to determine if any task items are grocery task items. In some cases, the grocery task items may not be included an a "groceries" task list. If any grocery task items are identified, the enhanced task management feature can provide a reminder to buy the grocery task items.

In one example, while analyzing the user-specific data, if the enhanced task management feature can determine that a user is going on a trip in one day, a reminder can be surfaced for any trip related task items. For example, the enhanced task management feature may surface a reminder for a "check-in for trip" task item and a "confirm hotel" task item.

In yet another example, the enhanced task management feature can analyze the user-specific data to determine the historical behavior of a user indicates that a user creates a "make hair appointment" on the 15th day of every month. Then, on the 15th day of month, the enhanced task management feature can determine that a reminder for "make hair appointment" should be surfaced.

FIGS. 5A-5D, 6, and 7 illustrate example scenarios for providing enhanced task management capabilities according to some embodiments of the invention. A user may open a user interface 505 of an electronic application 500, having an enhanced task management feature, on their computing device (e.g., device 110 of FIG. 1 which may be embodied, for example, as system 1300 described with respect to FIG. 13).

It is to be understood that the enhanced task management feature of the electronic application 500 may be initiated by any suitable method—direct or indirectly performed by a user—and the illustrations of FIGS. 5A-5D, 6, 7, and 8 are meant to be illustrative of some of the mechanisms to initiate the enhanced task management feature feature.

Figure 5A:
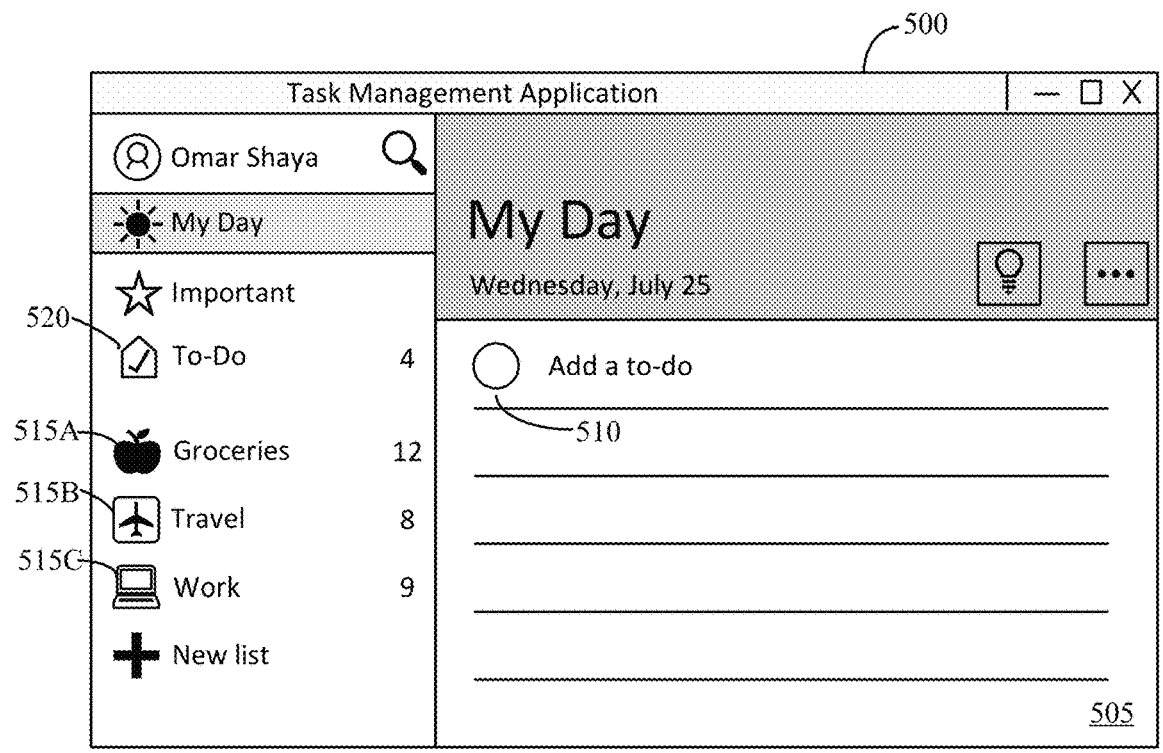
FIGS. 5A-5D illustrate an example scenario for providing enhanced task management capabilities according to an example embodiment of the invention.

Referring to FIG. 5A, the user interface 505 of the electronic application 500 can include one or more task input fields, such as task input field 510. It is through the task input field that the enhanced task management feature can receive task input associated with a task item from an application (such as described in step 205 of FIG. 2A or FIG. 2B).

According to various embodiments, the user interface 505 may display an index of one or more task lists created by the user and one or more default task lists. The one or more task lists created by the user and the one or more default task lists can be referred to as the existing user-specific task lists. In some cases, the user interface 505 can also display a number indicating the quantity of task items in each task list. In the illustrative example, three task lists created by the user (e.g., a "Groceries" task list 515A containing 12 task items, a "Travel" task list 515B containing 8 task items, and a "Work" task list 515C containing 9 task items) and one default task list (e.g., a "To-do" task list 520 containing 4 task items) are shown.

Figure 5B:
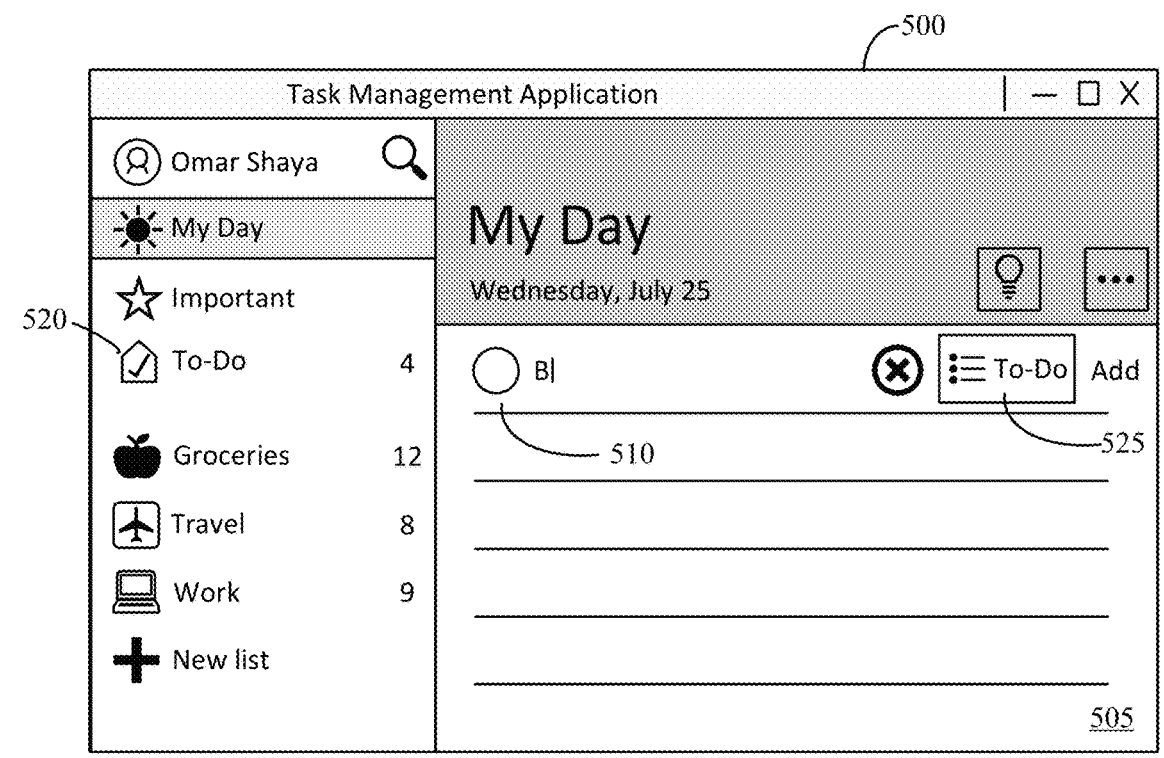

Referring to FIG. 5B, the user can enter task input associated with a task item in the task input field 510 and be presented with a suggested task list name for the task item. The suggested task list name may be presented in real-time or near real-time.

As the user starts interacting with the task input field 510, process 200 as described with respect to FIG. 2A or process 250 as described with respect to FIG. 2B can be initiated. Indeed, the enhanced task management feature can receive the task input associated with a task item (e.g., step 205 or step 255), identify at least one likely task list name for the task item (e.g., step 210 or step 260), and provide a suggested task list name from the at least one like task list name for display (e.g., step 215 or step 265).

In the illustrative example, the user enters the letter "B" as the task input in the task input field 510 and a "To-do" suggested task list name 525 is displayed as the suggested task list name. In this case, the "To-do" suggested task list name 525 refers to the default "To-do" task list 520.

Figure 5C:
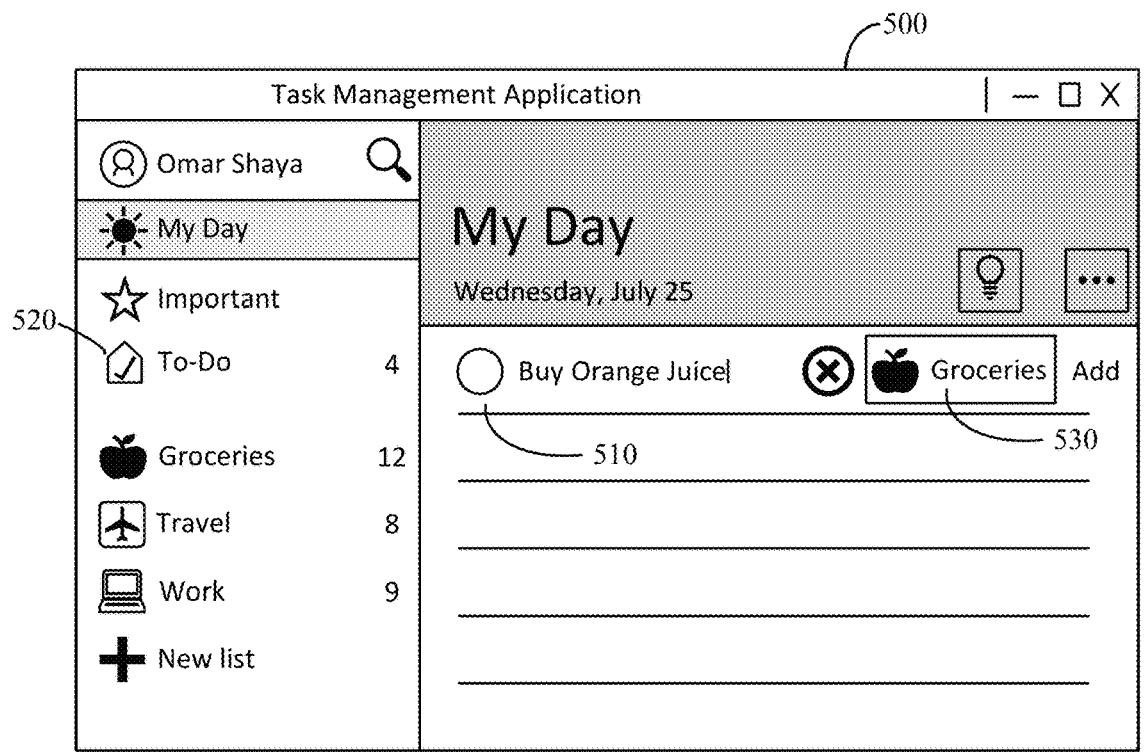

Referring to FIG. 5C, the user can continue to enter task input associated with a task item in the task input field 510 and be presented with a suggested task list name for the task item in real-time or near real-time. The user may, at any time, select the suggested task list name to add the task item to the task list associated with the suggested task list name.

As additional task input is entered into the task input field 510, the suggested task list name can be updated to reflect the additional task input by the user. Indeed, the enhanced task management feature can, as the input is received character-by-character, iteratively perform steps 205, 210, and 215 of process 200 as described with respect to FIG. 2A or steps 255, 260, and 255 of process 250 as described with respect to FIG. 2B to provide the suggested task list name.

In the illustrative example, the user entered the phrase "Buy orange juice" as the task input in the task input field 510 and "Groceries" suggested task list name 530 is displayed as the suggested task list name. In this case, the "Groceries" 530 suggested task list name refers to an existing user-specific task list (the "Groceries" task list 515A). Further, the user can select the "Groceries" suggested task list name 530 to add the task item to the task list associated with the suggested task list name.

Figure 5D:
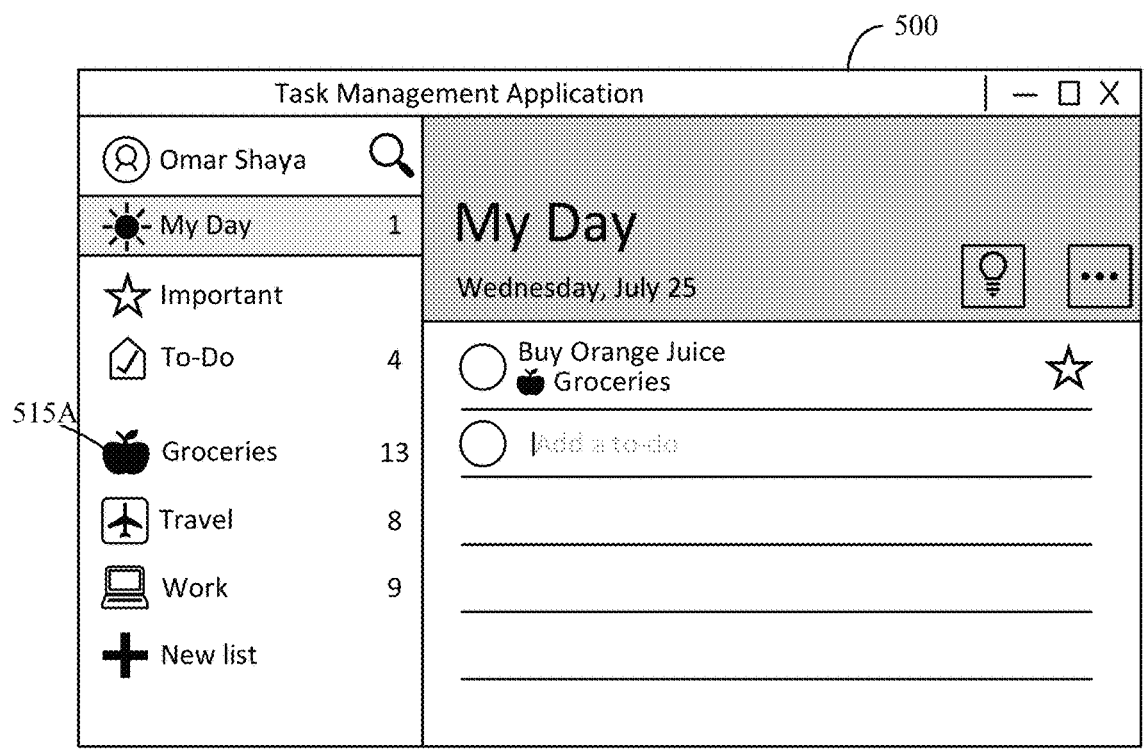

Referring to FIG. 5D, upon selecting the suggested task list name, the task item can be assigned to the task list associated with the suggested task list name.

In some cases, when the user selects the suggested task list name, the enhanced task management feature can receive a task list name and the task item (e.g., step 220 of FIG. 2A or step 270 of FIG. 2B) and assign the task item to a task list associated with the task list name (e.g., step 225 of FIG. 2A or step 275 of FIG. 2B).

In the illustrative example, when the user selects the "Groceries" suggested task list name, the enhanced task management feature receives the task list name and the task item. In this case, the task list name is "Groceries" and the task item is "Buy orange juice." The task list associated with the "Groceries" task list name is the "Groceries" task list 515A from the existing user-specific task lists. The enhanced task management feature can then assign "Buy orange juice" to the "Groceries" task list.

In some cases, the task item can be displayed in the user interface 505 as belonging to the assigned task list. In the illustrative example, the "Buy orange juice" task item is shown as belonging to the "Groceries" task list.

In some cases, when the task item is assigned to a task list, the number indicating the quantity of task items in the task list can be updated. In the illustrative example, the number indicating the quantity of task items in the "Groceries" task list has been updated to display that the "Groceries" task list contains 13 task items.

In some cases, when the task item is assigned to a task list, the enhanced task management feature can update one or more models, such as a user-specific model or an aggregated model (e.g., step 230 of FIG. 2A or step 280 of FIG. 2B) with the task item and the task list name.

Figure 6:
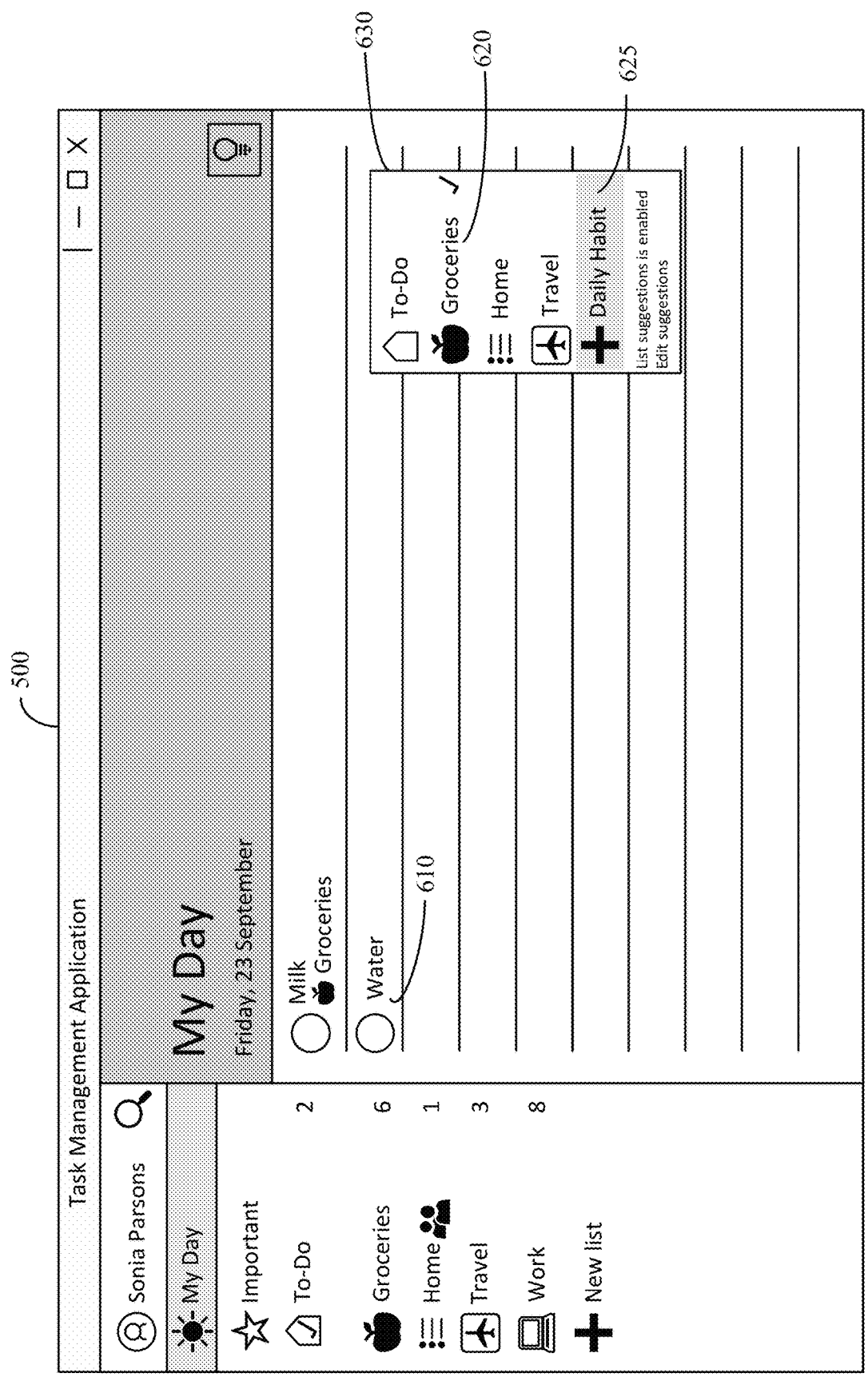
FIG. 6 illustrates a user interface in which enhanced task management capabilities are surfaced according to an embodiment of the invention.

Referring to FIG. 6, the user may be presented with suggested task list names from existing user-specific task lists (e.g., task lists previously created by the user) and/or existing aggregated task lists (e.g., task lists from an aggregated set of previously created tasks lists from a plurality of users). The suggested task list name may be presented in real-time or near real-time.

In the illustrative example, the user enters the phrase "water" as the task input in a task input field 610 and two suggested list names are displayed as suggested task list names. In this case, the two suggested list names include a "Groceries" suggested task list name 620 and a "Daily Habit" suggested list name 625. The "Groceries" suggested task list name 620 is a task list name of an existing user-specific task list (e.g., the "Groceries" task list) the "Daily Habit" suggested list name 625 a task list name of an existing aggregated task list (e.g., the "Daily Habit" task list).

In some cases, the suggested task list names may be displayed in a user interface, such as task management user interface 630. The task management user interface 630 can display the names of the existing user-specific task lists as well as the suggested task list name from the existing aggregated task lists.

In order to provide the suggested task list names, the enhanced task management feature may perform, for example, process 250 as described with respect to FIG. 2B. In one case, the enhanced task management feature can analyze the task input and user-specific data to determine a name of an existing user-specific task list (e.g., the most likely task list from the user's existing task lists). For example, the enhanced task management feature can determine that the "grocery" task list name is a likely task list name.

In one case, the enhanced task management feature can analyze the task input and the aggregated data to determine a name of an existing aggregated task list as one of the at least one likely task list name for the task item. In this case, the enhanced task management feature may determine, based on the aggregated model, the term "water" is most likely to belong to a "daily habit" task list. The enhanced task management feature can then suggest that the user create a new task list named "Daily Habit" and add the "water" task item to the newly created task list.

Figure 7:
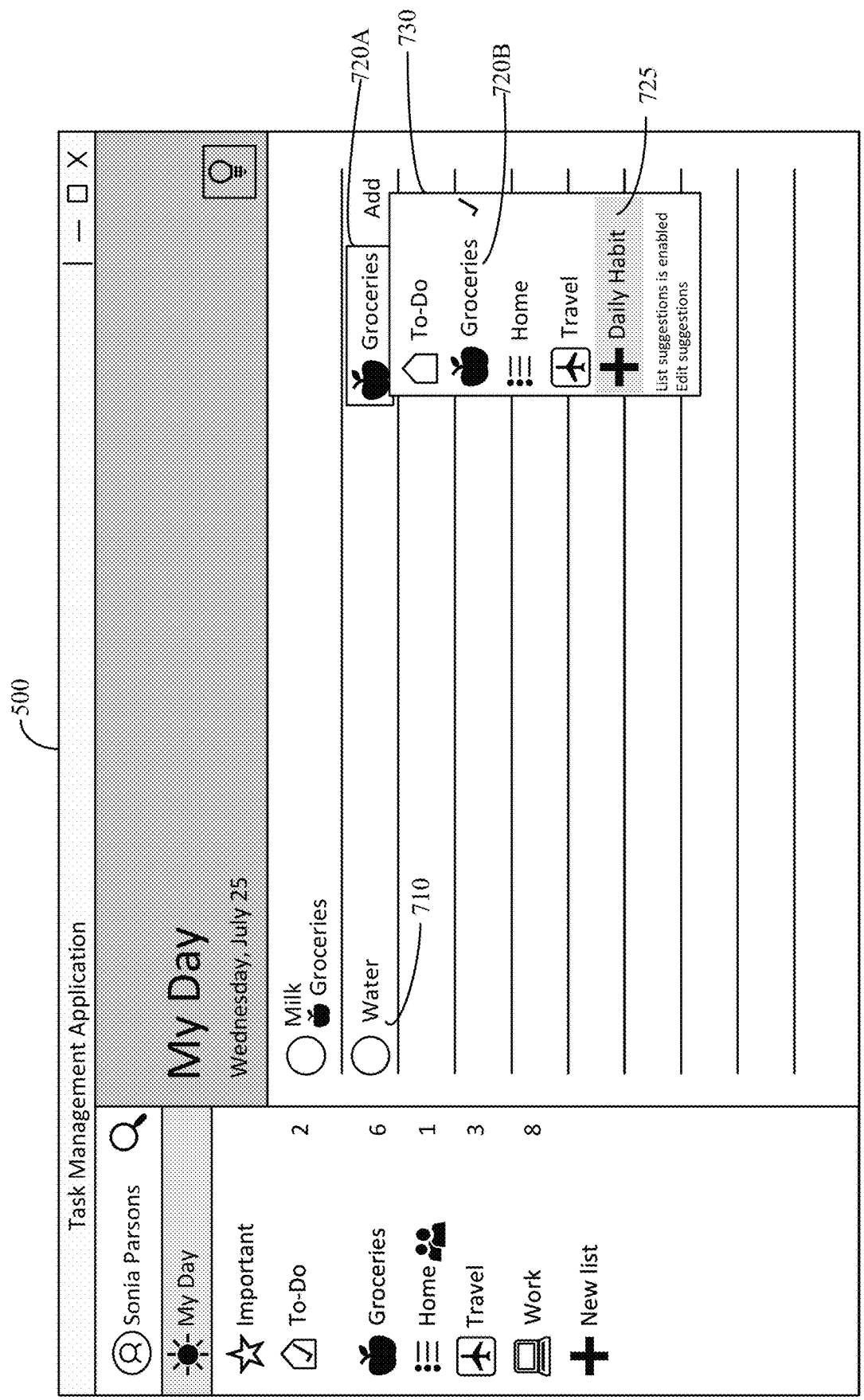
FIG. 7 illustrates a user interface in which enhanced task management capabilities are surfaced according to an embodiment of the invention.

Referring to FIG. 7, the user may be presented with suggested task list names from existing user-specific task lists (e.g., task lists previously created by the user) and/or existing aggregated task lists (e.g., task lists from an aggregated set of previously created tasks lists from a plurality of users). The suggested task list name may be presented in real-time or near real-time.

In the illustrative example, the user enters the phrase "water" as the task input in a task input field 710 and two suggested list names are displayed as suggested task list names. In this case, the two suggested list names include a "Groceries" suggested task list name 720 (e.g., "Groceries" suggested task list name 720A and "Groceries" suggested task list name 720B) and a "Daily Habit" suggested list name 725. The "Groceries" suggested task list name 720 is a task list name of an existing user-specific task list (e.g., the "Groceries" task list) the "Daily Habit" suggested list name 725 a task list name of an existing aggregated task list (e.g., the "Daily Habit" task list).

In some cases, the "Groceries" suggested task list name 720A may initially be displayed to the user. The "Groceries" suggested task list name 720A may be selected to display a user interface, such as task management user interface 730, which can display the names of the existing user-specific task lists as well as the suggested task list name from the existing aggregated task lists.

In order to provide the suggested task list names, the enhanced task management feature may perform, for example, process 250 as described with respect to FIG. 2B. In one case, the enhanced task management feature can analyze the task input and user-specific data to determine a name of an existing user-specific task list (e.g., the most likely task list from the user's existing task lists). For example, the enhanced task management feature can determine that the "grocery" task list name is a likely task list name.

In one case, the enhanced task management feature can analyze the task input and the aggregated data to determine a name of an existing aggregated task list as one of the at least one likely task list name for the task item. In this case, the enhanced task management feature may determine, based on the aggregated model, the term "water" is most likely to belong to a "daily habit" task list. The enhanced task management feature can then suggest that the user create a new task list named "Daily Habit" and add the "water" task item to the newly created task list.

Figure 8:
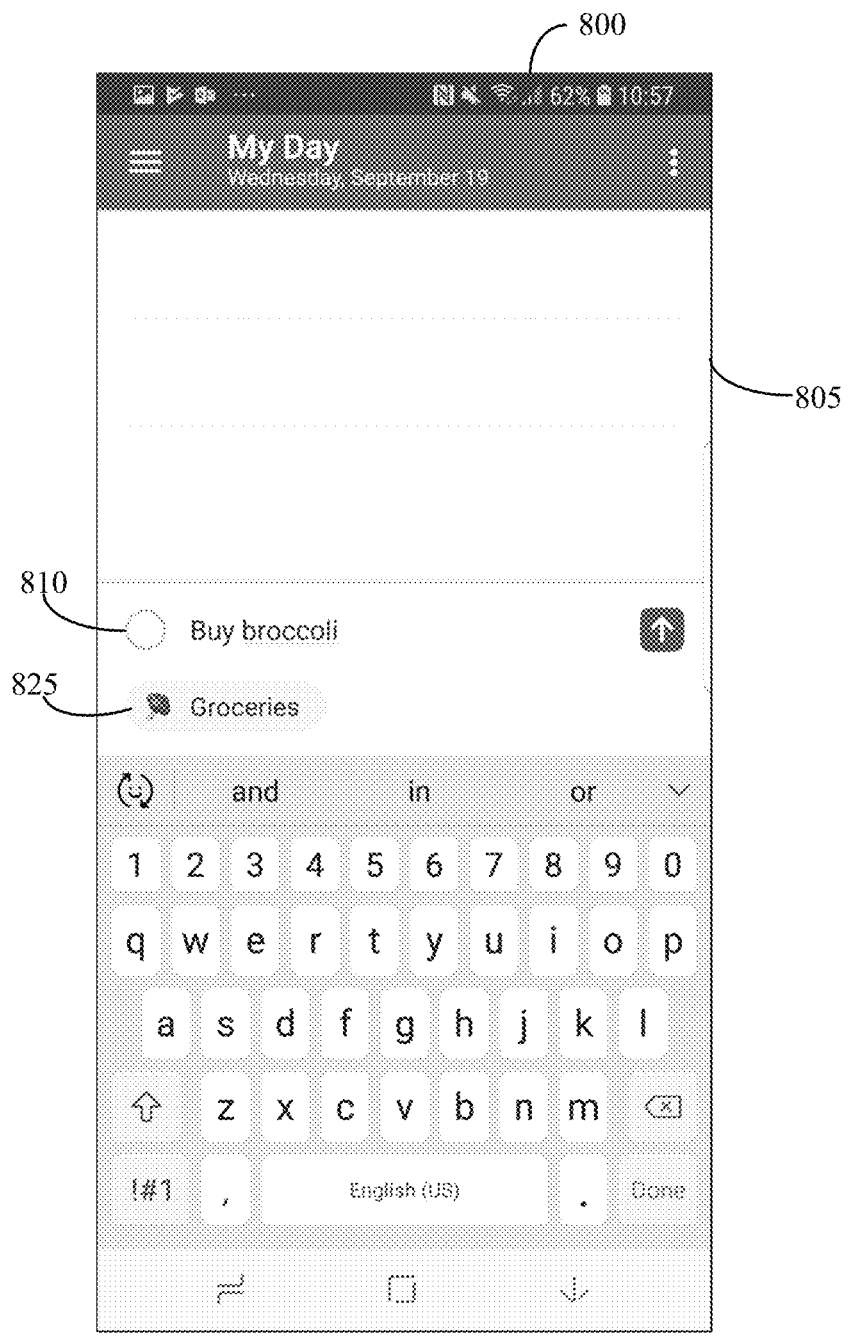
FIG. 8 illustrates a user interface of a mobile device in which enhanced task management capabilities are surfaced according to an example embodiment of the invention.

FIG. 8 illustrates a user interface of a mobile device in which enhanced task management capabilities are surfaced according to an embodiment of the invention.

Referring to FIG. 8, a user may open a user interface 805 of an electronic application 800, having an enhanced task management feature, on their mobile device (embodied, for example, as system 1300 described with respect to FIG. 13).

The user can enter task input associated with a task item in a task input field 810 of the user interface 805 and be presented with a suggested task list name for the task item. The suggested task list name may be presented in real-time or near real-time.

As the user starts interacting with the task input field 810, process 200 as described with respect to FIG. 2A or process 250 as described with respect to FIG. 2B can be initiated. For example, the enhanced task management feature can receive the task input associated with a task item (e.g., step 205 or step 255), identify at least one likely task list name for the task item (e.g., step 210 or step 260), and provide a suggested task list name from the at least one like task list name for display (e.g., step 215 or step 265).

In the illustrative example, the user enters the phrase "Buy broccoli" as the task input in the task input field 810 and a "Groceries" suggested task list name 825 is displayed as the suggested task list name.

Figure 9A:
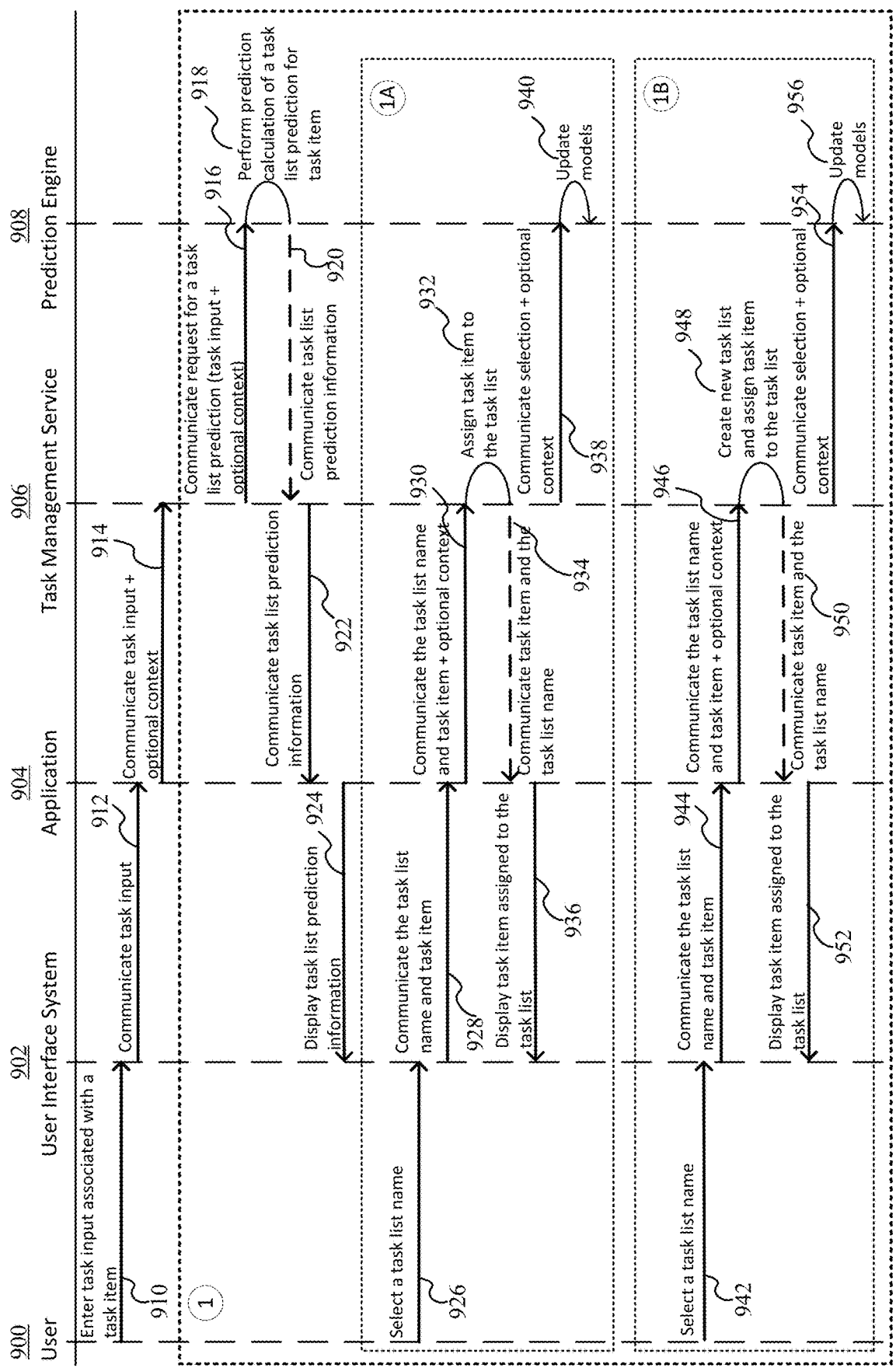
FIGS. 9A and 9B illustrate sequence diagrams with example process flows.
Figure 9B:
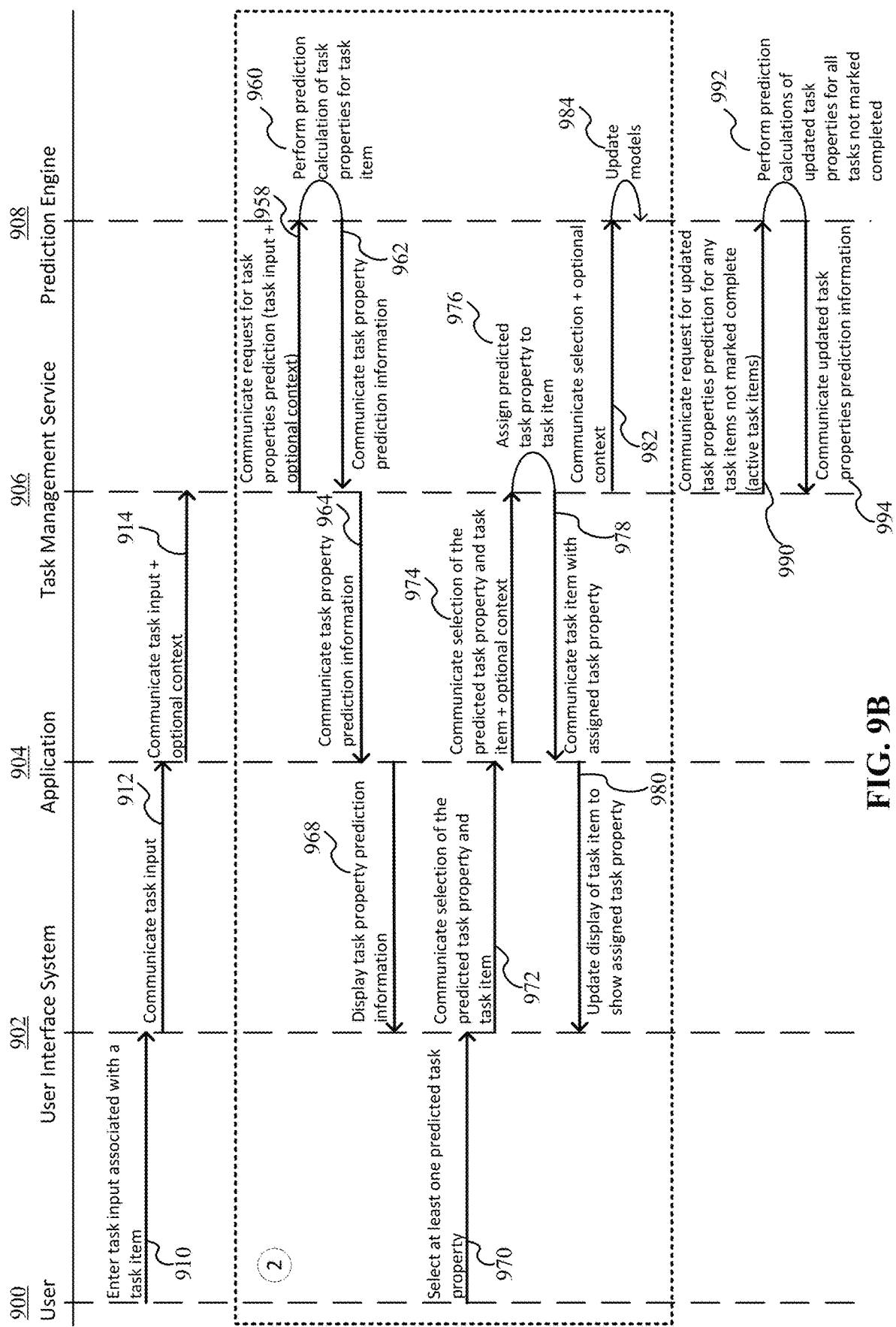

FIGS. 9A and 9B illustrate sequence diagrams with example process flows. The sequence diagrams include a user 900, a user interface system 902, an application 904, a task management service 906, and a prediction engine 908.

Figure 11:
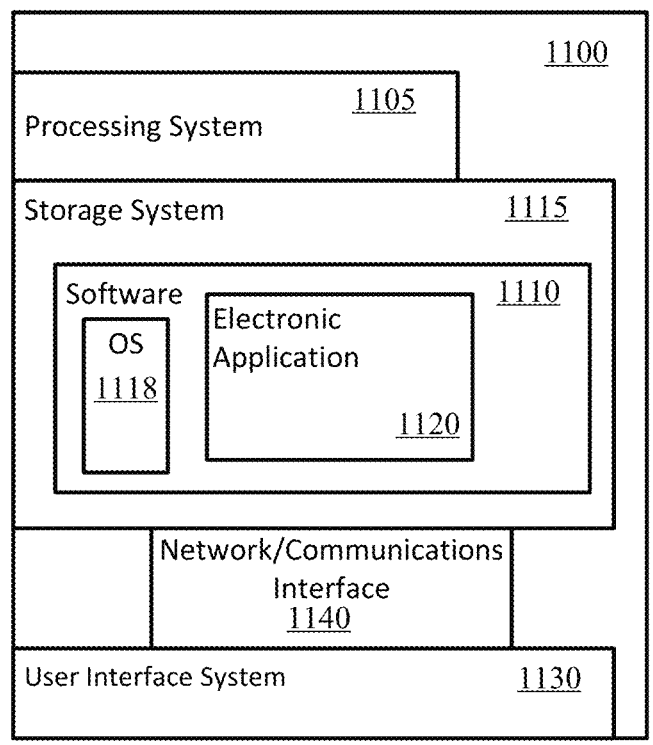
FIG. 11 illustrates components of a computing device that may be used in certain embodiments described herein.

The user interface system 902 may be embodied as user interface system 1130 as described with respect to FIG. 11, and may include input/output (I/O) devices and components that enable communication between the user 900 and the system. User interface system 902 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The application 904 may be any suitable application that includes a task input field coupled to an enhanced task management feature. The enhanced task management feature can be implemented by the task management service 906 and the prediction engine 908. The prediction engine 908 can be any suitable prediction engine, such as prediction engine 1000, as described with respect to FIGS. 10A and 10B.

Referring to FIG. 9A, the sequence flow for task management can begin when the user 900 interacts with the user interface system 902 to enter task input associated with a task item (910).

The task input may be received through a variety of channels and in a number of ways. For example, a task input field for natural language input can be provided through which the task input associated with the task can be entered. The task input field may be provided in any suitable application incorporating the enhanced task management feature (directly or indirectly).

The user interface system 902 can communicate the task input (912) to an application 904. The application 904 can then communicate the task input (914) to the task management service 906.

In some cases, the application 904 communicates context information along with the task input to the task management service 906. Context information can include, but is not limited to, a user ID, the current date/time, certain actions or inactions by a user, location (geo-location, home, office, mobile), content, client type, application permissions (reader mode, full editing mode), application type, application state, file, and the like. Context information can also include immediately preceding interactions of the user. In some cases, the application 904 may communicate with a device operating system and GPS to receive location data and communicates this location data to the task management service 906.

Once the task input and, optionally, context has been communicated (914) to the task management service 906, the task management service 906 can communicate (916) a request for task prediction information to the prediction engine 908.

In some cases, the request for task prediction information may be a request for a task list prediction for the task item. In some cases, the request for task prediction information may be a request for a task properties prediction for the task item. Scenario 1 of the sequence flow shows examples where the request for task prediction information is a request for a task list prediction for the task item. Scenario 2 of the sequence flow shows an example where the request for task prediction information is a request for a task properties prediction for the task item.

In scenario 1, the task management service 906 can communicate the request for a task list prediction (916) to the prediction engine 908. The request can include, for example, the task input and, optionally, the context information.

The prediction engine 908 can perform a prediction calculation of the task list prediction for the task item (918). The prediction engine 908 may use the task input and at least a user-specific model during the prediction calculation. In some cases, the prediction engine 908 may use an aggregated model.

In some cases, the prediction engine 908 may use a combination of user-specific models and/or aggregated models to perform the prediction calculation. In some cases, the at least one likely task list name for the task item can include not only one or more of the existing user-specific task lists, but also a task list from the existing aggregated task lists. In some cases, the task list from the existing aggregated task list may not be a task list included in the existing user-specific task lists.

After performing the prediction calculation, the prediction engine 908 can communicate (920) the task list prediction information to the task management service 906. In some cases, the task list prediction information may comprise a name of one or more likely task lists for the task item. In some cases, the one or more likely task lists will be in an ordered list, with the most likely task list first.

In some cases, the task list prediction information further comprises a confidence value, such as a number between 0 and 1, which can indicate how likely it is that the task item belongs to a certain task list. In an example where the task input is "plan the trip" the analysis of the task input and the user-specific data can determine that the task has an 80 percent chance of being in the "travel" task list and a 20 percent chance of being in the "work" task list.

The task management service 906 can communicate (922) the task list prediction information to the application 904 for display. The communication can include all or some of the task list prediction information.

The application 904 can display (924) the task list prediction information at the user interface system 902. The displayed task list prediction information can be a suggested task list name of the one of the one or more likely task lists.

A prediction is initiated when the user 900 enters the task input associated with a task item into the task input field. The prediction can be a dynamic or near real-time prediction. That is, a prediction can be updated as a user continues to enter task input into the task input field. For example, an initial prediction may be calculated as soon as the user enters a first character in the task input field. This initial prediction may be displayed to the user. Then, as the user continues to enter data, one or more updated predictions are calculated and presented to the user. The updated predictions may be the same prediction as the initial prediction or a new prediction.

Scenario 1 has two sub-scenarios, scenario 1A and scenario 1B. In scenario 1A, the user 900 selects (926) a task list name to add the task item. Here, the scenario is directed to the case where the selected task list name is the suggested task list name of the existing user-specific task lists.

The user interface system 902 can communicate (928) the selection of the task list name and the task item to the application 904. The application 904 can communicate (930) the selection of the task list name and task item, and optionally, context information, to the task management service 906. The task management service 906 can assign (932) the task item to the selected task list associated with the task list name and communicate (934) the task list name and the assigned task item to the application 904 for display. The application 904 can display (936), at the user interface system 902, the task item as being assigned to the task list.

In some cases, the task management service 906 may communicate (938) the task list name and the task item, and optionally, context information, to the prediction engine 908. The prediction engine 908 can then update (940) the one or models using the task list name and the task item, along with optional context information.

In scenario 1B, the user 900 selects (942) a task list name of to add the task item. Here, the scenario is directed to the case where the selected task list name is a suggested task list name of the existing aggregated task lists.

The user interface system 902 can communicate (944) the selection of the task list name and the task item to the application 904. The application 904 can communicate (946) the selection of the task list name and task item, and optionally, context information, to the task management service 906. The task management service 906 can create a new task list associated with the task list name and assign the task item to the task list (948). The task management service 906 can communicate (950) the task list name and the assigned task item to the application 904 for display. The application 904 can display (952), at the user interface system 902, the task item as being assigned to the task list.

In some cases, the task management service 906 may communicate (954) the task list name and the task item, along with optional context information, to the prediction engine 908. The prediction engine 908 can then update (956) the one or models using the task list name and the task item, along with optional context information.

Referring to FIG. 9B, scenario 2 of the sequence flow shows an example where the request for task prediction information is a request for a task property prediction for the task item. Similar to that described in FIG. 9A, the sequence flow can begin when the user 900 interacts with the user interface system 902 to enter task input associated with a task item (910). The user interface system 902 can communicate the task input (912) to an application 904 and the application 904 can then communicate the task input (914) to the task management service 906. The application 904 may also communicate context information along with the task input to the task management service 906.

Once the task input and optional context has been communicated (914) to the task management service 906, the task management service 906 can communicate (916) a request for task prediction information to the prediction engine 908.

In scenario 2, the task management service 906 can communicate the request for a task property prediction (958) to the prediction engine 908. The request can include, for example, the task input and, optionally, the context information.

The prediction engine 908 can perform a prediction calculation for the task property prediction for the task item (960). The prediction engine 908 may use the task input and at least a user-specific model during the prediction calculation. In some cases, the prediction engine 908 may use an aggregated model.

After performing the prediction calculation, the prediction engine 908 can communicate (962) the task property prediction information to the task management service 906. In some cases, the task list prediction information may comprise at least one likely task property for the task item. In some cases, the at least one likely task property will be in an ordered list, with the most likely task property first.

In some cases, the task property prediction information further comprises a confidence value, such as a number between 0 and 1, which can indicate how likely it is that the task item should be assigned a certain task property.

The task management service 906 can communicate (964) the task property prediction information to the application 904 for display. The communication can be all or some of the task property prediction information.

The application 904 can display (968) the task property prediction information at the user interface system 902. The displayed task property prediction information can be the at least one likely task property.

The user 900 can select (970) one or more of the at least one task property to assign to the task item. The user interface system 902 can communicate (972) the selection of the one or more of the at least one task property and the task item to the application 904. The application 904 can communicate (974) the one or more of the at least one task property and task item, and optional context information, to the task management service 906. The task management service 906 can assign (976) the one or more of the at least one task property to the task item and communicate (978) the task item with the assigned one or more of the at least one task property to the application 904 for display. The application 904 can update the display (980), at the user interface system 902, of the task item to show the task property assigned to the task item.

In some cases, the task management service 906 may communicate (982) the selected one or more of the at least one task property and the task item, along with optional context information, to the prediction engine 908. The prediction engine 908 can then update (984) the one or models using the one or more of the at least one task property and the task item, along with optional context information.

In some cases, the task management service 906 may communicate (990) a request for an updated task property prediction for any active task item, along with optional context information, to the prediction engine 908. The request for the updated task property prediction may comprise any active task items. An active task item refers to a task item that has not been marked as complete.

In some cases, the task management service 906 may receive a request, from the user 900, to update the task properties for all active task items one or more existing user-specific task lists. The task management service 906 can analyze the one or more existing user-specific task lists to determine each active item. The task management service 906 can then communicate the request for the updated task property prediction, each active task item, and optional context information to the prediction engine 908.

In some cases, the task management service 906 may periodically analyze one or more existing user-specific task lists to determine each active item and automatically communicate the request to the prediction engine.

The prediction engine 908 can perform a prediction calculation for the updated task property prediction for each active task item (992). The prediction engine 908 may use the active task items, the context information, a user-specific model and/or an aggregated model during the prediction calculation. For example, the prediction engine 908 can identify (e.g., predict) likely task properties for each active task item using the active task items, the context information, and one or more of user-specific data of a user-specific model and aggregated data of an aggregated model.

In some cases, the prediction engine 908 can communicate (994) updated task property prediction information to the task management service 906. The updated task property prediction information may include one or more likely task properties for each active task item.

The task management service 906 can update the task properties for each active task item. In some cases, the task management service 906 can compare, for each active task item, the one or more likely task properties to the current assigned task properties. When a change is found, the task management service 906 can then update a current assigned task property with the likely task property.

Methods that can be used by the enhanced task management feature when acting on user-specific data and/or aggregated data as part of the prediction engine include, but are not limited to, hierarchical and non-hierarchical Bayesian methods; supervised learning methods such as Support vector Machines, neural nets, bagged/boosted or randomized decision trees, and k-nearest neighbor; and unsupervised methods such as k-means clustering and agglomerative clustering. In some cases, other methods for clustering data in combination with computed auxiliary features may be used by the enhanced task management feature as appropriate.

Figure 10A:
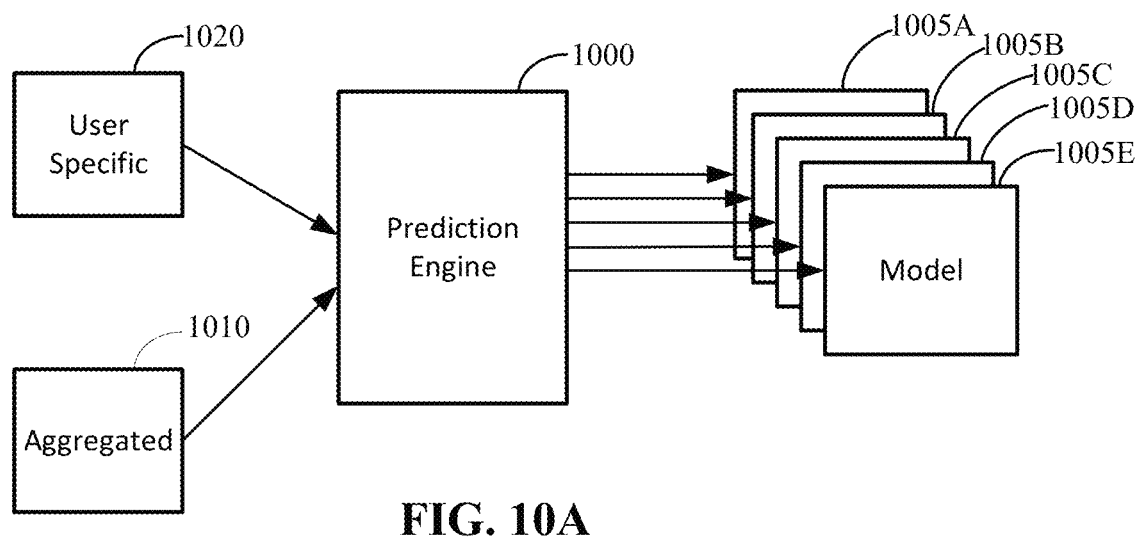
FIGS. 10A and 10B show diagrams of a system for predicting task information according to an example embodiment of the invention.
Figure 10B:
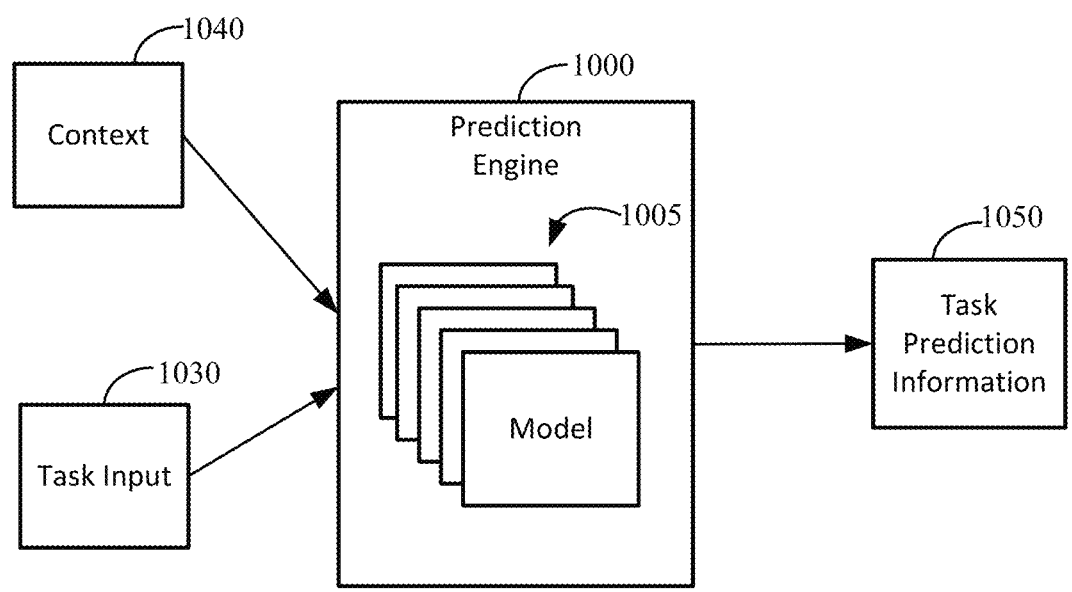

FIG. 10A and FIG. 10B show diagrams of a system for predicting task information according to an embodiment of the invention. The system can include a prediction engine 1000. The prediction engine 1000 can be implemented using hardware and/or software. The prediction engine 1000 can include prediction algorithms in the form of computer executable instructions stored on one or more computer-readable media and which can be carried out using a processor (e.g., a processor of user computing device 110). In some embodiments, the prediction algorithms can be in the form of logic performed in whole or in part by programmable logic gates or other hardware implementations.

In some cases, the prediction engine 1000 may be implemented, as part of an enhanced task management feature, within a single computing device or distributed across multiple computing devices or sub-systems that cooperate in executing program instructions.

Referring to FIG. 10A, the prediction engine 1000 can receive data and generate models 1005 (e.g., model 1005A, model 1005B, model 1005C, model 1005D, and model 1005E) by processing the data. The data used by the prediction engine 1000 can include aggregated data 1010 stored in an aggregated data resource, such as aggregated data resource 146 as described with respect to FIG. 1, and user-specific data 1020 stored in a task data resource, such as task data resource 140A and task data resource 140B as described with respect to FIG. 1.

Aggregated data 1010 and user-specific data 1020 can each be stored in any suitable format that can convey relationships between the data, for example as a table, a tree structure, or any other suitable multi-dimensional structure. The aggregated data 1010 can be an aggregate of user-specific data for a plurality of users ("aggregated data"). The aggregated data 1010 can include existing aggregated task lists and associated task items. The user-specific data 1020 can comprise existing user-specific task lists and associated task items. The user-specific data 1020 can also include task interaction history of the user as well as other task properties.

The prediction engine 1000 may continuously receive additional aggregated data 1010 and user-specific data 1020, which may be processed to update the models 1005. The models 1005 can be generated and updated on any suitable set or subset of the aggregated data 1010 and the user-specific data 1020.

In some cases, the models 1005 can be stored locally, for example, as an offline version. In some of such cases, the models 1005 may continue to be updated locally using the user-specific data 1020.

Referring to FIG. 10B, the prediction engine 1000 can receive task input 1030, perform prediction calculations, and output predictive information (e.g., task prediction information 1050) based on the performed prediction calculations. The task prediction information 1050 can include, but is not limited to, likely task list names for task items and likely task properties for task items. The task prediction information 1050 predicted by the prediction engine 1000 can be provided to a task management service and output on a display of, for example, a user computing device as part of a UI of any suitable application, such as a task management application.

The prediction calculations can be performed using one or more of the generated models 1005. The models 1005, which may include certain user-specific models and certain aggregated models, can be used separately or in combination when performing a task prediction calculation, such as for a task list prediction and/or a task property prediction. According to various embodiments, for each prediction calculation, different models can be selected by the prediction engine and then used to perform the prediction calculation.

In addition to task input 1030, the prediction engine 1000 can receive context information 1040. The context information 1040 can be used while performing prediction calculations. Some context information may be obtained from the user-specific data (received from a user-specific log). In other cases, the context data is obtained from other memory locations storing information related to a current task management or productivity application session of a user.

As previously mentioned, context information includes, but is not limited to, the current date/time, certain actions or inactions by a user, location (geo-location, home, office, mobile), content, client type, application permissions (reader mode, full editing mode), application type, application state, file, and the like. Context can also include immediately preceding interactions of the user.

In some cases, by knowing context information of client location, predictive information directed to task items generally interacted with at that location may be provided. For example, when a user indicates that they are working from their office, certain task lists may be more likely to be used as opposed to when a user is working from home. In another example, when a user's location indicates they are at a grocery store, a grocery task list may be the most appropriate task list prediction.

In some cases, by knowing context information of when (date/time) certain task items are interacted with, the predicted information may be based on time-related preferences. For example, task items entered during the day from Monday to Friday may relate to work. Thus, the most appropriate task list prediction is a work task list.

Figure 12:
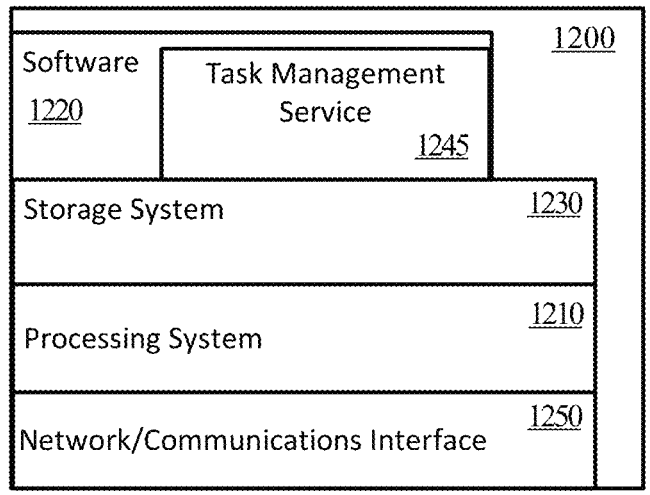
FIG. 12 illustrates components of a computing system that may be used to implement certain methods and services described herein.

FIG. 11 illustrates components of a computing device that may be used in certain embodiments described herein; and FIG. 12 illustrates components of a computing system that may be used to implement certain methods and services described herein.

Referring to FIG. 11, system 1100 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 1100 may be incorporated to implement a particular computing device.

System 1100 includes a processing system 1105 of one or more processors to transform or manipulate data according to the instructions of software 1110 stored on a storage system 1115. Examples of processors of the processing system 1105 include general purpose central processing units, application specific processors, and logic devices, as well as any other type of processing device, combinations, or variations thereof. The processing system 1105 may be, or is included in, a system-on-chip (SoC) along with one or more other components such as network connectivity components, sensors, video display components.

The software 1110 can include an operating system 1118 and application programs such as an electronic application 1120 that calls the task management service as described herein. Device operating systems 1118 generally control and coordinate the functions of the various components in the computing device, providing an easier way for applications to connect with lower level interfaces like the networking interface.

Storage system 1115 may comprise any computer readable storage media readable by the processing system 1105 and capable of storing software 1110 including the electronic application 1120.

Storage system 1115 may include volatile and nonvolatile memories, removable and non-removable media implemented in any method or technology for storage of information, such as computer readable instructions, data structures, program modules, or other data. Examples of storage media of storage system 1115 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 1115 may be implemented as a single storage device but may also be implemented across multiple storage devices or sub-systems co-located or distributed relative to each other. Storage system 1115 may include additional elements, such as a controller, capable of communicating with processing system 1105.

Software 1110 may be implemented in program instructions and among other functions may, when executed by system 1100 in general or processing system 1105 in particular, direct system 1100 or the one or more processors of processing system 1105 to operate as described herein.

The system can further include user interface system 1130, which may include input/output (I/O) devices and components that enable communication between a user and the system 1100. User interface system 1130 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 1130 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 1130 may also include user interface software and associated software (e.g., for graphics chips and input devices) executed by the OS in support of the various user input and output devices. The associated software assists the OS in communicating user interface hardware events to application programs using defined mechanisms. The user interface system 1130 including user interface software may support a graphical user interface, a natural user interface, or any other type of user interface. For example, the user interfaces for the electronic application 1120 described herein may be presented through user interface system 1130.

Network interface 1140 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 1118, which informs applications of communications events when necessary.

Certain aspects described herein, such as those carried out by the task management service described herein may be performed on a system such as shown in FIG. 12. Referring to FIG. 12, system 1200 may be implemented within a single computing device or distributed across multiple computing devices or sub-systems that cooperate in executing program instructions. The system 1200 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1200 can include a processing system 1210, which may include one or more processors and/or other circuitry that retrieves and executes software 1220 from storage system 1230. Processing system 1210 may be implemented within a single processing device but may also be distributed across multiple processing devices or sub-systems that cooperate in executing program instructions.

Storage system(s) 1230 can include any computer readable storage media readable by processing system 1210 and capable of storing software 1220. Storage system 1230 may be implemented as a single storage device but may also be implemented across multiple storage devices or sub-systems co-located or distributed relative to each other. Storage system 1230 may include additional elements, such as a controller, capable of communicating with processing system 1210.

Software 1220, including task management service 1245, may be implemented in program instructions and among other functions may, when executed by system 1200 in general or processing system 1210 in particular, direct the system 1200 or processing system 1210 to operate as described herein for the task management service 1245 (and its various components and functionality).

System 1200 may represent any computing system on which software 1220 may be staged and from where software 1220 may be distributed, transported, downloaded, or otherwise provided to yet another computing system for deployment and execution, or yet additional distribution.

In embodiments where the system 1200 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communication interface 1250 may be included, providing communication connections and devices that allow for communication between system 1200 and other computing systems (not shown) over a communication network or collection of networks (not shown) or the air.

Certain techniques set forth herein with respect to the electronic application and/or task management service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory propagating signals.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method comprising:
   generating a user-specific model using user-specific data comprising existing user-specific task lists and associated task items, the user-specific model generated by a machine learning process, a neural network process, or an artificial intelligence process;
   receiving task input associated with a task item from an application;
   identifying, using the task input and at least the user-specific model, at least one likely task list name for the task item, whereby a combination of at least the user-specific model and the task input automatically produces a task list prediction;
   providing a suggested task list name from the at least one likely task list name to the application for display, the suggested task list name being the task list prediction;
   receiving a task list name and the task item, the task list name being a selection of one of the suggested task list name, a new task list name, or a different task list name;
   assigning the task item to a task list associated with the task list name; and
   updating the user-specific model with the task item and the task list name.

2. The method of claim 1, wherein the suggested task list name is a name of an existing user-specific task list.

3. The method of claim 1, wherein identifying the at least one likely task list name for the task item comprises:
   analyzing the task input and the user-specific data to determine the at least one likely task list name for the task item.

4. The method of claim 1, further comprising generating an aggregated model using aggregated data comprising an aggregate of anonymized user-specific task lists and associated task items and task properties of a plurality of users, the aggregated model generated by the machine learning process, the neural network process, or the artificial intelligence process,
   wherein identifying the at least one likely task list name for the task item further uses the aggregated data of the aggregated model, the identifying comprising:
   analyzing the task input and the user-specific data to determine a name of an existing user-specific task list; and
   analyzing the task input and the aggregated data to determine a name of an existing aggregated task list.

5. The method of claim 4, wherein the suggested task list name is the name of an existing aggregated task list, the method further comprising creating the task list associated with the task list name.

6. The method of claim 4, further comprising updating the aggregated model with the task item and the task list name.

7. The method of claim 1, wherein the user-specific data further comprises task properties assigned to the task items.

8. The method of claim 7, further comprising:
   identifying at least one likely task property for the task item;
   providing the at least one likely task property to the application for display;
   receiving one or more task properties and the task item, the one or more task properties being a selection of one or more of the at least one likely task property or a new task property;
   assigning the one or more task properties to the task item; and
   updating at least the user-specific model with the task item and the one or more task properties.

9. The method of claim 8, wherein identifying the at least one likely task property for the task item comprises:
   obtaining context information; and
   analyzing the task item, the context information, and one or more of the user-specific data and aggregated data of an aggregated model to determine the at least one likely task property for the task item, the aggregated data comprising existing aggregated task lists, associated task items, and task properties assigned to the task items.

10. The method of claim 8, further comprising:
receiving a request for updated task properties for active task items of one or more of the existing user-specific task lists, the request comprising context information;
analyzing the one or more of the existing user-specific task lists to determine each active task item, each active task item having assigned task properties;
identifying likely task properties for each active task item using the active task items, the context information, and one or more of the user-specific data and aggregated data of an aggregated model, the aggregated data comprising existing aggregated task lists, associated task items, and task properties assigned to the task items;
determining, for each active task item, if there is a change in task properties by comparing the assigned task properties and the likely task properties; and
updating the assigned task properties with the likely task properties for the active task items if there is a change in the task properties.

11. The method of claim 7, further comprising:
receiving a trigger for a task property assigned to at least one of the task items of the user-specific data;
obtaining context information, wherein the context information comprises at least one of a timestamp, user location, content, client type, application type, and application state;
determining at least one reminder by analyzing the trigger, the task items, and the context information; and
providing the at least one reminder for display.

12. A computer readable storage medium having instructions stored thereon that, when executed by a processor, perform a method comprising:
generating a user-specific model using user-specific data comprising existing user-specific task lists and associated task items and an aggregated model using aggregated data comprising an aggregate of anonymized user-specific task lists and associated task items and task properties of a plurality of users, the user-specific model and the aggregated model generated by a machine learning process, a neural network process, or an artificial intelligence process;
receiving task input associated with a task item from an application;
identifying, using the task input, the user-specific model, and the aggregated model, at least one likely task list name for the task item, whereby a combination of at least the user-specific model, the aggregated model, and the task input automatically produces a task list prediction;
providing a suggested task list name from the at least one likely task list name to the application for display, the suggested task list name being the task list prediction;
receiving a task list name and the task item, the task list name being a selection of one of the suggested task list name, a new task list name, or a different task list name;
assigning the task item to a task list associated with the task list name; and
updating the user-specific model and the aggregated model with the task item and the task list name.

13. The medium of claim 12, wherein identifying the at least one likely task list name for the task item comprises:
analyzing the task input and the user-specific data to determine a name of an existing user-specific task list; and
analyzing the task input and the aggregated data to determine a name of an existing aggregated task list.

14. The medium of claim 12, wherein the suggested task list name is the name of an existing aggregated task list, the method further comprising creating the task list associated with the task list name.

15. The medium of claim 12, wherein the method further comprises:
identifying at least one likely task property for the task item, wherein identifying the at least one likely task property for the task item comprises:
obtaining context information; and
analyzing the task item, the context information, and one or more of the user-specific data and the aggregated data to determine the at least one likely task property for the task item;
providing the at least one likely task property to the application for display;
receiving one or more task properties and the task item, the one or more task properties being a selection of one or more of the at least one likely task property or a new task property;
assigning the one or more task properties to the task item; and
updating at least the user-specific model with the task item and the one or more task properties.

16. The medium of claim 12, wherein the method further comprises:
receiving a trigger for a task property assigned to at least one of the task items of the user-specific data;
obtaining context information, wherein the context information comprises at least one of a timestamp, user location, content, client type, application type, and application state;
determining at least one reminder by analyzing the trigger, the task items, and the context information; and
providing the at least one reminder for display.

17. A system comprising:
a processing system;
a storage system; and
instructions stored on the storage system that, when executed by the processing system, direct the processing system to:
generate a user-specific model using user-specific data comprising existing user-specific task lists and associated task items and an aggregated model using aggregated data comprising an aggregate of anonymized user-specific task lists and associated task items and task properties of a plurality of users, the user-specific model and the aggregated model generated by a machine learning process, a neural network process, or an artificial intelligence process;
receive task input associated with a task item from an application;
identify, using the task input, the user-specific model, and the aggregated model, at least one likely task list name for the task item, whereby a combination of at least the user-specific model, the aggregated model, and the task input automatically produces a task list prediction;
provide a suggested task list name from the at least one likely task list name to the application for display, the suggested task list name being the task list prediction;

receive a task list name and the task item, the task list name being a selection of one of the suggested task list name, a new task list name, or a different task list name;

assign the task item to a task list associated with the task list name; and update the user-specific model and the aggregated model with the task item and the task list name.

18. The system of claim 17, wherein the instructions to identify the at least one likely task list name for the task item direct the processing system to:

analyze the task input and the user-specific data to determine a name of an existing user-specific task list; and analyze the task input and the aggregated data to determine a name of an existing aggregated task list.

19. The system of claim 17, wherein the instructions further direct the processing system to:

identify at least one likely task property for the task item, wherein identifying the at least one likely task property for the task item comprises:

obtain context information; and analyze the task item, the context information, and one or more of the user-specific data and the aggregated data to determine the at least one likely task property for the task item;

provide the at least one likely task property to the application for display;

receive one or more task properties and the task item, the one or more task properties being a selection of one or more of the at least one likely task property or a new task property;

assign the one or more task properties to the task item; and update at least the user-specific model with the task item and the one or more task properties.

20. The system of claim 17, wherein the instructions further direct the processing system to:

receive a trigger for a task property assigned to at least one of the task items of the user-specific data;

obtain context information, wherein the context information comprises at least one of a timestamp, user location, content, client type, application type, and application state;

determine at least one reminder by analyzing the trigger, the task items, and the context information; and provide the at least one reminder for display.

* * * * *